United States Patent
Shkoury et al.

(10) Patent No.: US 11,764,679 B2
(45) Date of Patent: Sep. 19, 2023

(54) POWER DEVICE

(71) Applicant: Solaredge Technologies Ltd., Herzeliya (IL)

(72) Inventors: Roy Shkoury, Rehovot (IL); Ohad Gidon, Netanya (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/148,996

(22) Filed: Jan. 14, 2021

(65) Prior Publication Data

US 2021/0218336 A1    Jul. 15, 2021

Related U.S. Application Data

(60) Provisional application No. 62/961,387, filed on Jan. 15, 2020.

(51) Int. Cl.
*H02M 3/158* (2006.01)
*H02J 3/38* (2006.01)

(52) U.S. Cl.
CPC ........... *H02M 3/1584* (2013.01); *H02J 3/381* (2013.01); *H02J 2300/26* (2020.01)

(58) Field of Classification Search
CPC .... H02M 3/1584; H02J 3/381; H02J 2300/26; H02J 1/08; H02J 2300/24; H02J 3/38; Y02E 10/56; H02S 10/00; H02S 40/34
See application file for complete search history.

(56) References Cited

U.S. PATENT DOCUMENTS

| | | | | |
|---|---|---|---|---|
| 2009/0284998 A1* | 11/2009 | Zhang | ....................... | G05F 1/67 |
| | | | | 363/55 |
| 2012/0223584 A1* | 9/2012 | Ledenev | .................. | H02J 3/381 |
| | | | | 307/43 |
| 2013/0106194 A1* | 5/2013 | Jergovic | ................... | H02J 3/385 |
| | | | | 307/77 |
| 2015/0381108 A1 | 12/2015 | Hoft et al. | | |
| 2018/0234051 A1* | 8/2018 | Ni | .............. | H02J 3/38 |
| 2018/0351354 A1* | 12/2018 | Galin | ....................... | H02J 3/466 |
| 2019/0027617 A1* | 1/2019 | Varlan | ..................... | H02S 50/10 |
| 2019/0157986 A1* | 5/2019 | Ginart | ..................... | H02M 3/158 |
| 2020/0153336 A1* | 5/2020 | Mihai | ........................ | H02J 7/35 |
| 2021/0328436 A1* | 10/2021 | Gao | ........................ | H02J 3/381 |

FOREIGN PATENT DOCUMENTS

| | | |
|---|---|---|
| CN | 204349909 U | 5/2015 |
| EP | 0000355 A1 | 1/1979 |
| EP | 3410551 A1 | 12/2018 |

OTHER PUBLICATIONS

Apr. 28, 2021—European Search Report—EP 21151584.6.

* cited by examiner

*Primary Examiner* — Toan T Vu
(74) *Attorney, Agent, or Firm* — Banner & Witcoff, Ltd.

(57) ABSTRACT

Systems, apparatuses, and methods are described for a power device in a power system. The power device may include a plurality of power stages, which may reduce the number of connectors needed for the power system. The plurality of power stages in the same power device may allow the power device to be configured with additional functionalities.

20 Claims, 29 Drawing Sheets

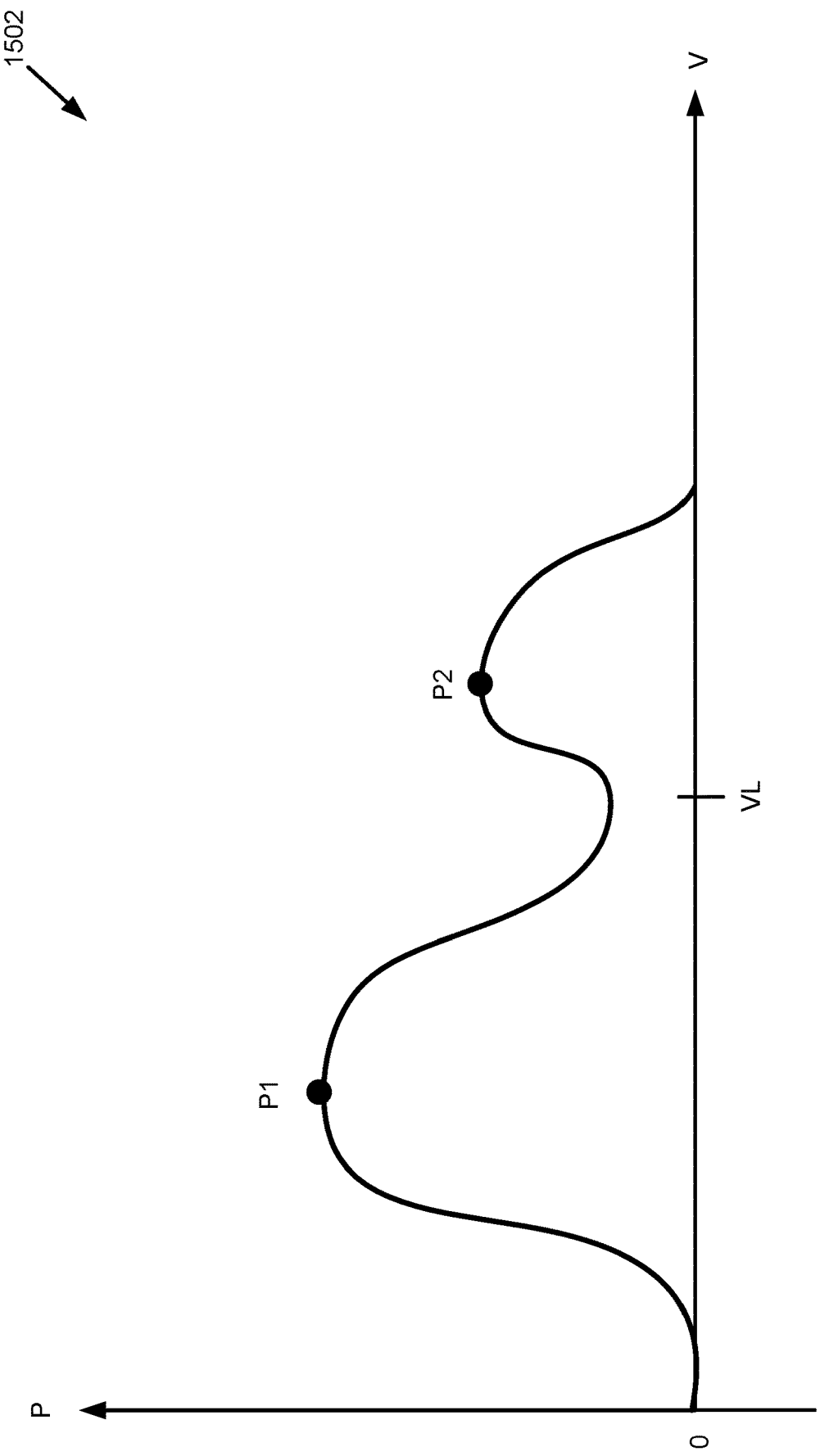

POWER DEVICE

BACKGROUND

A photovoltaic (PV) system is a power system designed to supply solar power by converting sunlight into electricity. PV systems generally include solar panels or "PV modules". PV modules include a number of solar cells. PV systems are used in commercial and residential applications. PV systems may include a plurality of power devices (e.g., direct current [DC] to DC converters). One issue with PV systems is that they may include a plurality of physical connections between elements of the system, which may require the use of physical connectors that allow an electrical connection (e.g., PV connectors, for example, MC4 connectors). The use of these physical connectors may lead to other issues in the power system (for example, loss of power, arcing, fires, etc.).

SUMMARY

The following summary presents a simplified summary of certain features. The summary is not an extensive overview and is not intended to identify key or critical elements.

Systems, apparatuses, and methods are described for a power device in power systems, e.g., PV systems. The power device may include a plurality of power stages thereby reducing the number of connectors needed for the power system. Reducing the number of connectors may also reduce the loss of power in the system, and may reduce the risk associated with the connectors. Reducing the number of connectors may also increase the ease of installing/setting up and maintaining the power system. The power device may comprise additional power stages in the same power device, which may allow the power device to be configured with additional functionalities.

In some examples the power device may be configured to control an output of the power device (e.g., an output current and/or an output voltage generated by the plurality of power stages).

In some examples the power device may be configured to perform a current-voltage operating point search and/or a peak sweep/peak search (e.g., a peak power search), even at relatively lesser voltages.

In some examples, the power device may be configured to obtain data (e.g., performance data) related to a relatively lesser voltage.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 15B shows a graph, in accordance with certain examples of the presently disclosed subject matter.

DETAILED DESCRIPTION

Figure 1A:
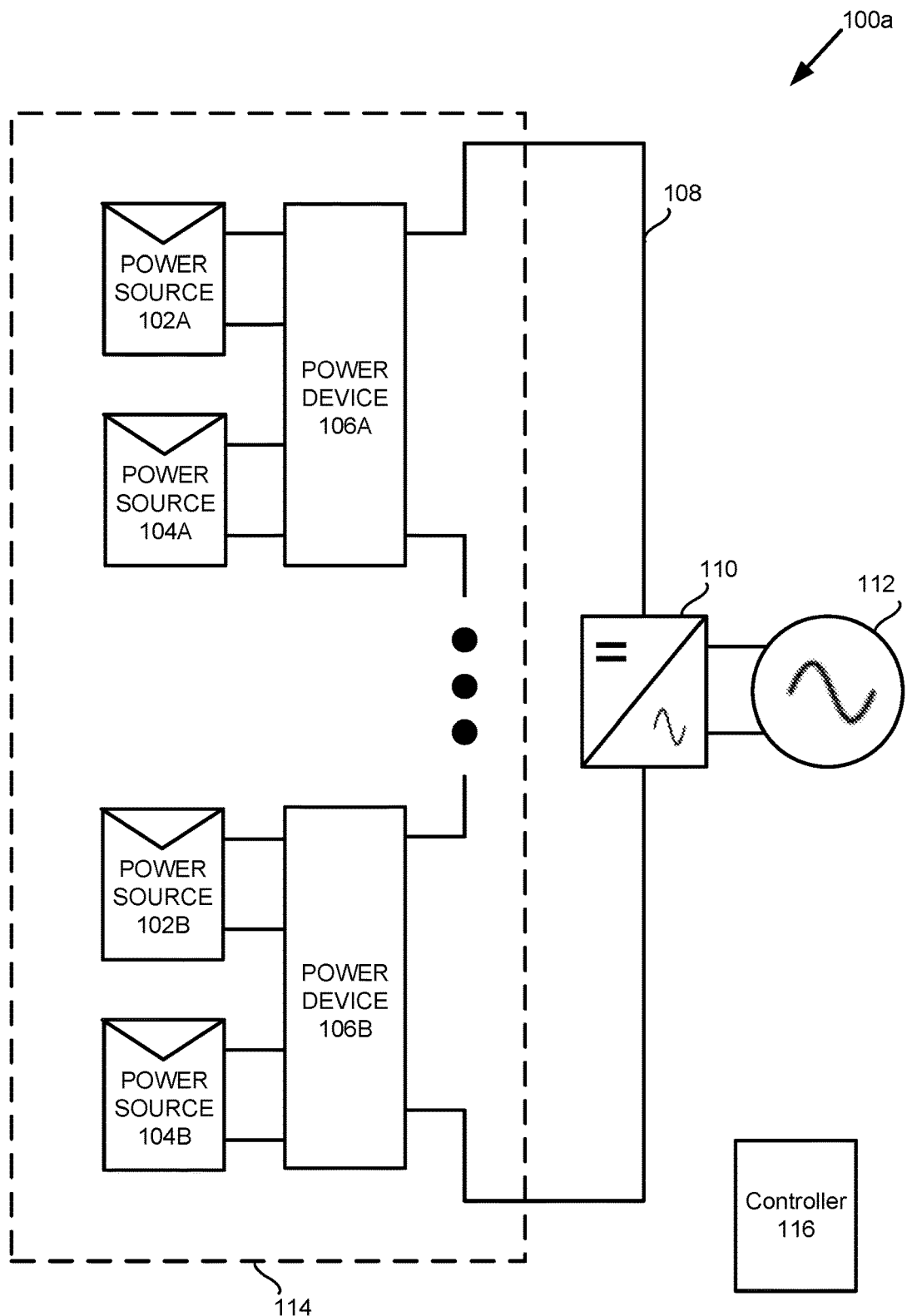
FIG. 1A shows a power system, in accordance with certain examples of the presently disclosed subject matter.

The accompanying drawings, which form a part hereof, show examples of the disclosure. It is to be understood that the examples shown in the drawings and/or discussed herein are non-exclusive and that there are other examples of how the disclosure may be practiced.

It is noted that the teachings of the presently disclosed subject matter are not bound by the power systems described with reference to the figures. Equivalent and/or modified functionality may be consolidated or divided in another manner and may be implemented in any appropriate combination. For example, power source 102A and power device 106A, which are shown as separate units of power system 100a (FIG. 1A), may have their functionalities and/or components combined into a single unit.

It is also noted that the teachings of the presently disclosed subject matter are not bound by the flow charts shown in the figures, and the shown operations may occur out of the shown order. For example, some operations may be executed substantially concurrently or in the reverse order. It is also noted that whilst the flow charts are described with reference to elements of power systems shown herein, this is by no means binding, and the operations may be performed by elements other than those described herein.

It is also noted that like references in the various figures refer to like elements throughout the application. This includes similar references, for example, it is to be understood that power source 102A and power source 102B shown in FIG. 1A may be similar to other power sources 102 described and shown herein, and vice versa. Throughout the application certain general references may be used to refer to any of the specific related elements. For example, power system 100 may refer to any of the various power systems, power device 106 may refer to any of the various power devices, switches Q may refer to any of the various switches, etc.

It is also noted that all numerical values given in the examples of the description are provided for purposes of example only and are by no means binding.

The terms, "substantially", "about", "sufficient", "efficiently", and, "threshold", used herein include variations that are equivalent for an intended purpose or function (e.g., within a permissible variation range). Certain values or ranges of values are presented herein with numerical values being preceded by the terms "substantially", "about", "sufficient", and, "threshold". The terms "substantially", "about", "sufficient", and "threshold", are used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

The term, "controller", used herein may include a computer and/or other appropriate processor/processing circuitry and memory. The terms "computer" or "processor" or variations thereof should be expansively construed to cover any kind of hardware-based electronic device with data processing capabilities including, by way of non-limiting example a digital processing device (e.g., digital signal processor (DSP), microcontroller, field programmable circuit, application-specific integrated circuit (ASIC), etc.) or a device which comprises or is operatively connected to one or more processing devices, or an analog circuit implementing control logic. The terms "memory" or "data storage device" used herein should be expansively construed to cover any volatile or non-volatile computer memory suitable to the presently disclosed subject matter. The above may include, by way of non-limiting example, controllers Con, Con1, Con2, 116 disclosed in the present application.

FIG. 1A to FIG. 2B show examples of various power systems 100 with power devices 106 according to examples of the present subject matter.

Reference is now made to FIG. 1A, which shows a power system 100a according to examples of the present subject matter. Power system 100a includes a plurality of power sources 102A, 104A, 102B, 104B. As an example, power system 100a may be a PV power system, and power sources 102A, 104A, 102B, 104B may be PV generators (e.g., one or more photovoltaic cells, strings of substrings of photovoltaic cells, or strings of photovoltaic panels). Although power sources are described herein in the context of PV generators, it will be appreciated that the term power source may include other types of power sources, for example: wind turbines, hydro-turbines, fuel cells, batteries, etc. Power sources 104 may be similar to power sources 102.

A first plurality of power sources 102A, 104A may be connected to power device 106A. Power sources 102A, 104A may be in series, parallel, or neither with respect to each other. Power device 106A may include a plurality of terminals configured to connect each individual power source 102A, 104A to the power device 106A.

A second plurality of power sources 102B, 104B may be connected to power device 106B. Power sources 102B, 104B may be in series, parallel, or neither with respect to each other. Power device 106B may include a plurality of terminals configured to connect each individual power source 102B, 104B to the power device 106B.

Power device 106A and power device 106B may be connected to one or more system power device(s) 110. Power device 106A and power device 106B may be connected to one another in a series or parallel connection (e.g., connected to one another at their outputs, with at least one output terminal of a first power device being connected to at least one other output terminal of a second power device). Power device 106A and power device 106B may be connected to one or more system power device(s) 110. Power device 106A and power device 106B are shown in FIG. 1A as being connected in a series connection forming a series string 114 of power devices. As an example, an output terminal of power device 106A may be connected in series to an output terminal of power device 106B. For example, power device 106A may be connected to power device 106B using a single physical connector. Additional power devices similar to or the same as power devices 106A and 106B may be further connected in series as part of series string 114. Series string 114 may be connected to system power device(s) 110 via a bus 108 (e.g., a DC bus).

System power device(s) 110 may be, for example, one or more: DC to DC converter(s) (e.g., buck converters, boost converters, buck/boost converters, and/or buck+boost converters, etc.), DC to alternating current (AC) converter(s)/inverter(s), combiner and/or monitoring boxes, etc. System power device(s) 110 may be an inverter for one or more phases (e.g., a one phase inverter, two phase inverter, and/or a three phase inverter, etc.), and may include lines/phases that are not shown herein for the sake of simplicity.

System power device(s) 110 may be connected to one or more loads 112. The one or more loads 112 may include, for example: an electrical grid (e.g., an AC electrical grid), a storage device (e.g., a battery), a resistive device (e.g., a resistor), an AC device (e.g., a motor), etc.

Each power device 106A, 106B may include a plurality of power stages, as described in greater detail below with reference to FIG. 3A to FIG. 6B. The term "power stage" used herein may refer to a converter (e.g., a power converter) or sub-converter that is part of the power device 106.

A power stage may be, for example, one or more: DC to DC converter(s) (e.g., buck converters, boost converters, buck/boost converters, buck+boost converters, Cuk converters, etc.), DC to AC converter(s)/inverter(s), micro-inverter(s), flyback converters, etc. The plurality of power stages may be located inside a single shared housing or enclosure of the power device 106 (i.e., inside the same housing or enclosure as each other). In some examples, the plurality of power stages may be located on the same printed circuit board (PCB) (e.g., which may be located inside the single shared housing or enclosure of the power device 106). Providing a plurality of power stages in the same housing and/or on the same circuit board may have the advantage of reducing the number of components and/or electrical connectors otherwise needed in the power system (e.g., MC4 connectors which generally are needed to connect between devices in different housings or enclosures, and/or other connectors, such as circuit board jumpers, that might be used to connect between a plurality of different PCBs that may be located in a single housing or enclosure). Reducing the number of components and/or electrical connectors otherwise needed in the power system may potentially reduce the complexity and/or cost of components (e.g., related to the need for having more components) used in a system and/or reduce electrical losses in the power system. Fewer connections (e.g., MC4 connectors) may also provide fewer imperfect connections during installation. Fewer connections (e.g., MC4 connectors) may also provide fewer corroded connections over time of use. Imperfect connections and corroded connections may potentially lead to disastrous situations (e.g., arcs and/or fires).

Power system 100a may include a plurality of controllers (e.g., controllers Con, Con1, Con2, 116, described herein below), and one or more of those controllers may be designated as a master controller/central controller 116. In some cases, the central controller 116 may be the master controller. In some examples, each power device 106 may have its own controller with or without an external central controller 116, and one or more of those internal controllers may be designated as a master controller. FIG. 1A shows controller 116 as a central controller external to power device(s) 106 and system power device(s) 110. In some cases, one or more controllers may be included in power device(s) 106, system power device(s) 110, and one or more of the internal controllers may be designated as a central controller/master controller. As an example, the functionality of central controller 116 may be included in one or more controllers included as part of power device(s) 106 and system power device(s) 110. For example, power device(s) 106 may have a plurality of controllers, and one or more of those controllers may be designated as a master controller which provides instructions/indications/signals to one or more other controllers.

The one or more controllers of power system 100a may be configured to receive and/or transmit instructions as signals/instructions/indications/commands to and/or from one or more other elements of the power system. As mentioned above, one or more controllers may include one or more processors/processing circuits and memory configured to access data and make determinations/calculations/computations.

For simplicity, some connections between controllers and the other elements of power system 100a (e.g., power devices 106, system power devices 110, switches Q, one or more sensors [e.g., voltage sensors Vsensor, current sensors Isensor, etc., described herein below], etc.) are not shown in FIG. 1A. It will be appreciated that in some examples power device(s) 106, system power device(s) 110, and/or one or more sensor(s), may be communicatively and/or operably connected to one or more controller. For example, one or more sensor(s) may provide data to the one or more controllers.

The one or more sensor(s) may be configured to obtain one or more parameter/parameter data related to power system 100a. This one or more parameter may be an electrical parameter, for example: current, voltage, power, temperature, irradiance, etc.

Providing a plurality of power stages in the same power device 106 may allow the power device 106 to require fewer elements than if the plurality of power stages were in separate power devices 106.

Figure 6A:
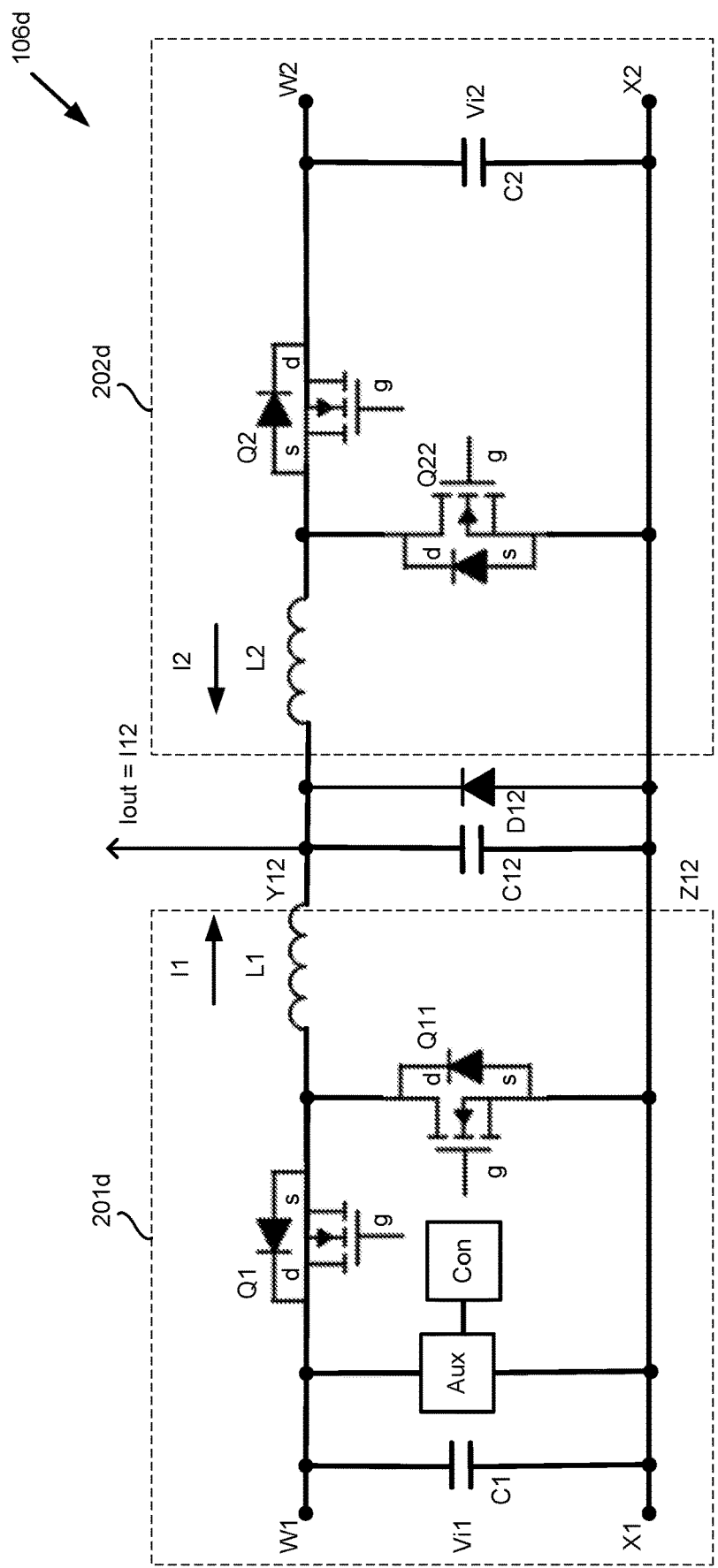
FIG. 6A shows a power device, in accordance with certain examples of the presently disclosed subject matter.
Figure 6B:
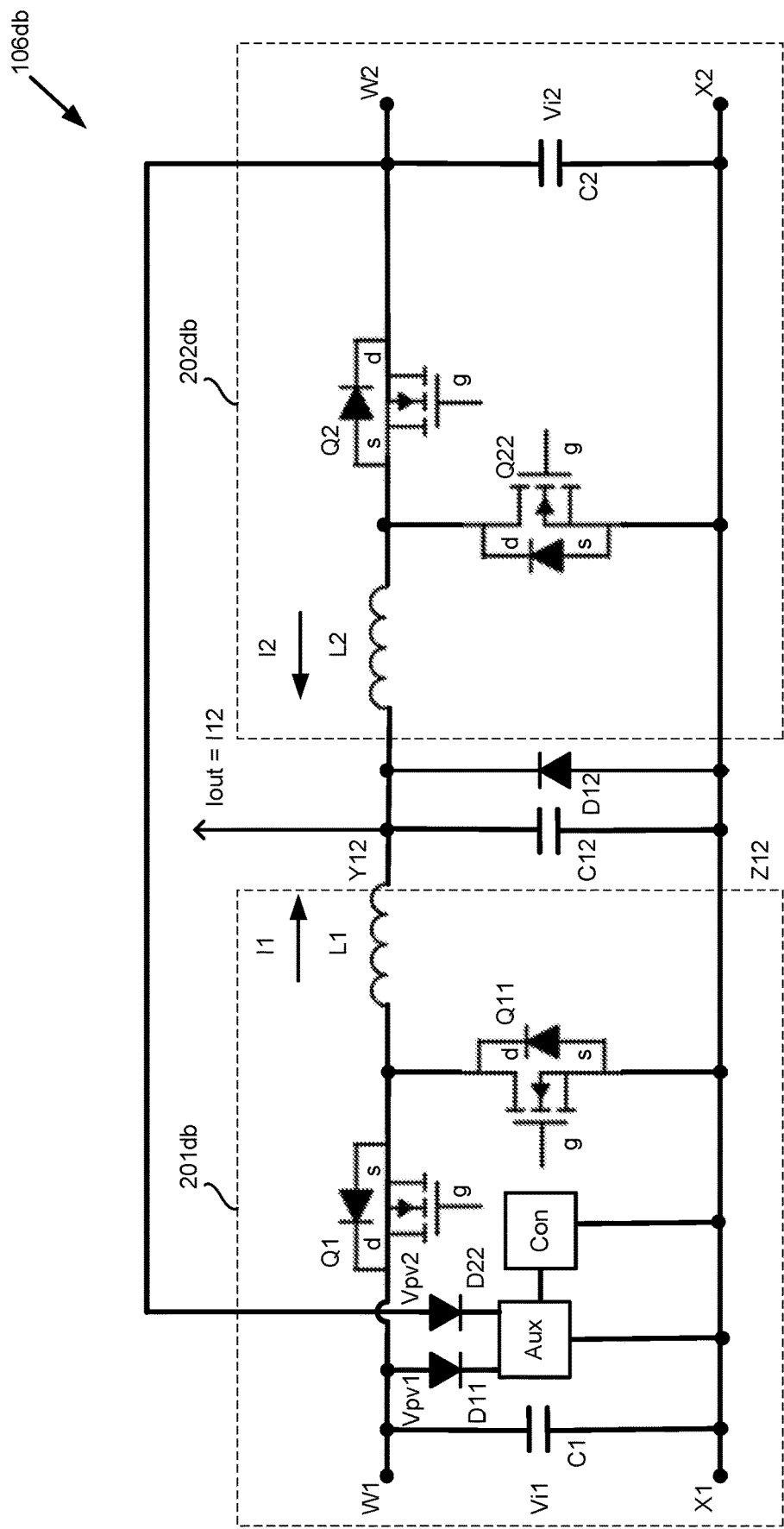
FIG. 6B shows a power device, in accordance with certain examples of the presently disclosed subject matter.

For example, a power device with a plurality of power stages may have a single shared controller (e.g., an internal controller, for example, controller Con in FIG. 6A and FIG. 6B), instead of a plurality of controllers. The single controller may be configured to control the plurality of power stages in the power device. As an example, the single controller may be configured to increase power for the plurality of power stages in the power device (e.g., by using multiple power point tracking [MPPT] operations, and/or, for example, the single controller may be configured to cancel output ripples by controlling the pulse width modulation [PWM] of the plurality of power stages so that there is about a 180 degree phase difference, or another phase difference, between current and/or voltage ripple at the outputs of the different power stages. For example, one or more power stages may be configured to produce output voltage and/or current having a first ripple, and one or more other power stages may be configured to produce output voltage and/or current having a second ripple such that peaks of the first ripple correspond to troughs of the second ripple, and the total current and/or voltage may thereby have a lower ripple amplitude, potentially increasing efficiency and power output by the power device. As another example, the single controller may be configured to control separate signals to each of the plurality of power stages in the power device (e.g., signals to the gates [g] of one or more switches Q).

The shared controller (and/or other circuits/circuitries configured to increase power) may be configured to take into account different duty cycles used for different power stages of the plurality of power stages. For example, if a first converter is operating at a duty cycle of fifty percent, and a second converter is also operating at a duty cycle of fifty percent, a common controller used to control the first and second converter may operate the converter switches at a phase shift of about 180 degrees. For example, if a first converter is operating at a duty cycle of fifty percent, and a second converter is operating at a duty cycle of forty percent, a common controller used to control the first and second converter may operate the converter switches at a phase shift of slightly more or less than 180 degrees, which may cause an alignment or near-alignment of a peak voltage/current ripple in the first converter with a trough voltage/current ripple in the second converter.

As another example, a power device having a plurality of power stages may have a single shared data storage device/memory (not shown) (e.g., flash memory), instead of a plurality of data storage devices/memories.

As another example, a power device having a plurality of power stages may have a single shared software program (not shown), instead of a plurality of software programs (e.g., as may be required if the plurality of power stages were in separate power devices). For example, the single shared software program may be run by a single shared controller or by a plurality of controllers.

As another example, a power device having a plurality of power stages may have a single shared power-line communication (PLC) circuit/circuitry (not shown), instead of a plurality of PLC circuits/circuitries. The single PLC circuit/circuitry may be configured to control communication (e.g., reception and transmission of signals) to/from each of the power stages separately and/or together. For example, the single PLC circuit/circuitry may be configured to transmit data related to each power stage (e.g., obtained parameter data, measurements, telemetries, etc.) and/or data related to other elements of the power system (e.g., one or more power sources) separately over a power line connected at an output of one or more of the plurality of power stages (e.g., using one or more transmitters [not shown]). The single PLC circuit/circuitry may receive, such as by monitoring a power line connected at an output of one or more of the plurality of power stages, data related to the plurality of power stages and/or data related to other elements of the power system (e.g., one or more power sources) together and/or separately (e.g., using one or more receivers [not shown]). The single shared PLC circuit/circuitry may be configured to transmit one or more signals without the use of a signal combiner by, for example, synchronizing transmissions related to separate converters to be transmitted at different times, and/or by transmitting messages that include data related to more than one of the power stages.

As another example, a power device with a plurality of power stages may have a single shared discharge/rapid shut down (RSD) circuit/circuitry (e.g., discharge circuitry Dis, described herein below), instead of a plurality of discharge/RSD circuits/circuitries. The single shared discharge/rapid shut down (RSD) circuit/circuitry may be configured to perform discharge at an input and/or output of one or more power stages and/or power source(s) (e.g., discharge a voltage related to the power device, for example, discharge an input voltage and/or an output voltage related to the power device). In some cases, the shared discharge circuit may discharge a common input/output shared by one or more power stages. In some cases, the shared discharge circuit may discharge a common input/output shared by one or more power stages while one or more other power stages and/or power source(s) continue to operate without performing discharge.

As another example, a power device with a plurality of power stages may have a single shared protection circuit/circuitry (not shown) (e.g., overvoltage protection, duty cycle disorder protection, leakage protection, etc.) configured to protect one or more elements of the power system, instead of a plurality of protection circuits/circuitries. The protection circuit may be configured to provide protection against surges at the output of the power device, or may be configured to provide protection against static overvoltage (e.g., output tolerances according to one or more thresholds). For example, the protection circuit may include one or more transient voltage suppressor (TVS) or metal-oxide varistor (MOV) configured to protect against surges (e.g., relatively great overvoltage values, for example, hundreds of volts over a maximum voltage threshold). As another example, the protection circuit may include one or more leakage balancer(s) or Zener diode(s) configured to perform impedance matching and protect against static overvoltage (e.g., relatively lesser overvoltage values, for example, about 5 volts over a maximum voltage threshold).

As another example, a power device having a plurality of power stages may have a single shared auxiliary power circuit (e.g., auxiliary power unit Aux in FIG. 5), instead of a plurality of auxiliary power circuits. The single auxiliary power circuit/unit may be configured to provide power to one or more elements of the power system (e.g., controllers, switch gate drivers, and/or one or more data storage devices).

As another example, a power device having a plurality of power stages may have one or more shared sensors (e.g., current sensor, voltage sensor, power sensor, temperature sensor, irradiance sensor, etc.), instead of a plurality of sensors (e.g., as may be required if the plurality of power stages were in separate power devices). The one or more shared sensors may be configured to sense/obtain data related to a plurality of power stages. For example, if the outputs of a plurality of power stages are connected in parallel, then a single shared voltage sensor may be configured to measure an output voltage related to the plurality of power stages (e.g., instead of requiring a plurality of voltage sensors). As another example, if the outputs of a plurality of power stages are connected in series, then a single shared current sensor may be configured to measure an output current related to the plurality of power stages (e.g., instead of requiring a plurality of current sensors). In some examples, the plurality of power stages may share a single inductor, and a single shared current sensor may be configured to measure the inductor current.

As another example, a power device having a plurality of power stages may have one or more shared bypass diode, instead of a plurality of bypass diodes (e.g., as may be required if the plurality of power stages were in separate power devices). The single bypass diode may be configured to bypass a plurality of power stages (e.g. based on/in response to one or more bypass indications/bypass conditions, for example, related to malfunction and/or underproduction of one or more element of the power system, for example, one or more of the power stages). Having a single bypass diode instead of a plurality of bypass diodes may reduce the losses in the power system when current is flowing through the single bypass diode (e.g., as opposed to if the current was required to flow through a plurality of bypass diodes instead, with each bypass diode incurring losses).

As another example, a power device having a plurality of power stages may have a single shared capacitor (e.g., output capacitor and/or input capacitor), instead of a plurality of capacitors (e.g., output capacitors and/or input capacitors, for example, as may be required if the plurality of power stages were in separate power devices). The single capacitor (e.g., output capacitor and/or input capacitor) may be configured to store energy for a plurality of power stages.

As another example, a power device having a plurality of power stages may have a single shared inductor (e.g. an output inductor) and/or a single shared inductor core with separate windings, instead of a plurality of inductors (e.g., as may be required if the plurality of power stages were in separate power devices). The single shared inductor and/or the single shared inductor core with separate windings may be smaller and/or may take up less space (e.g., on a printed circuit board), compared to a plurality of inductors.

In some cases, providing a plurality of power stages in the same power device 106 while not reducing a number of certain elements (e.g., the number of elements required if the plurality of power stages were in separate power devices 106) may allow the power device 106 to be configured with additional functionalities (e.g., that might not be otherwise possible, for example, if the power device 106 had only a single element instead of a plurality of elements).

For example, if a power device only has a single auxiliary power circuit/unit and a single controller then the controller might not be able to obtain data related to a solar panel connected at the input to the power device at relatively lesser voltage values (e.g., less than a threshold, such as an auxiliary threshold voltage of the controller; for example, less than about 12 V, less than about 5 V, at about 0 V, and/or at less than about 0 V), since a certain threshold voltage output by the solar panel may be required for the auxiliary power circuit/unit to power itself. However, in a case where the power device has a plurality of auxiliary power circuits/units connected to a corresponding plurality of power sources (e.g., solar panels) then one or more first auxiliary power circuit/unit may be used to provide auxiliary power to the plurality of power stages of the power device, while another auxiliary power circuit/unit may be used to help one or more element of the power system (e.g., one or more controller) to obtain data related to the power system (e.g., a solar panel connected to the power device) even at relatively lesser voltage values. For example, data obtained at a relatively lesser voltage may be used to produce one or more tools (e.g., graphs, for example, one or more current-voltage [I-V] curves) that may be used to determine diagnostics related to one or more elements of the power system. The obtained parameter data may be used to help determine a faulty and/or malfunctioning element of the power system (e.g., one or more switches/diodes, for example, a burnt diode, or a solar panel suffering from potential induced degradation). As another example, one or more auxiliary power circuits/units may be used to provide auxiliary power functions for the plurality of power stages of the power device, while one or more other auxiliary power circuits/units may be used to help one or more element of the power system (e.g., one or more controller) to perform a current-voltage operating point search (e.g., a sweep of the whole I-V curve, for example, not necessarily by the peak power point) and/or a peak sweep/peak search (e.g., to determine an operating voltage value that may provide a maximum power output of one or more power sources). For example, the current-voltage operating point search and/or peak sweep/peak search may even include parameter data obtained at relatively lesser voltage values. The current-voltage operating point search and/or peak sweep/peak search may be done to determine an operating point.

As another example, the power device having a plurality of auxiliary power circuits/units may allow the power device to begin operation even when only one of the power sources is producing power at a sufficient threshold (e.g., without requiring additional power sources to be producing power at a sufficient threshold). As an example, the plurality of auxiliary power circuits/units may be connected to the different respective power source(s) and/or one or more controller via a shared/common ground potential (described in greater detail below). For example, if a first power source/plurality of power sources is producing power above a certain threshold (e.g., the PV module is receiving a certain amount of irradiance), then at least one of the plurality of auxiliary power sources may receive sufficient voltage (e.g., a wake-up signal) to begin operation. In this case, power may be provided to one or more controllers which may be configured obtain parameter data related to/monitor the power system. This may allow one or more elements of the power system (e.g., one or more power sources, one or more power devices, one or more controllers, etc.) to be monitored and/or begin production/begin operation at an early point in the day then might be possible if the power device only had a single auxiliary power circuit/unit. This may also allow one or more elements of the power system (e.g., one or more power sources, one or more power devices, one or more controllers, etc.) to be monitored and/or begin production/begin operation even when that element is not producing sufficient voltage for other reasons (e.g., shading or malfunction).

As another example, the power device having a plurality of power stages may have a plurality of PLC circuits/circuitries. The plurality of PLC circuits/circuitries and/or one or more controllers controlling the PLC circuits may be configured to be synchronized to avoid issues of the plurality of PLC circuits/circuitries performing certain operations at the same time. For example, the plurality of PLC circuits/circuitries may be configured so that each PLC circuit/circuitry transmits signals in turn (e.g., one at a time, so that a plurality of PLC circuits/circuitries are not transmitting together at about the same time, for example to avoid any collisions/interferences between the transmission signals). It will be appreciated that the plurality of PLC circuits/circuitries and/or one or more controllers controlling the PLC circuits may be configured to communicate with one another (e.g. coordinate operation with one another, for example, to help ensure that the operation of one PLC circuit/circuitry is not interfering with the operation of another PLC circuit/circuitry). It will also be appreciated that in a power device with a plurality of power stages having a plurality of PLC circuits/circuitries, the communication between the plurality of PLC circuits/circuitries and/or other elements of the power system (e.g., one or more controllers) may be relatively quick (e.g., due to the PLC circuits/circuitries and/or other elements being located relatively close to one another, for example, in the same enclosure or housing, and/or on the same circuit board, such that the signals may only have to travel a relatively short distance). Communication between the plurality of PLC circuits/circuitries may also be used to synchronize one or more operations of the plurality of power stages.

As another example, the power device having a plurality of power stages may have a plurality of controllers (e.g., low voltage [LV] controllers, for example controllers Con1, Con2 shown in some of the figures) that may be configured to control one or more elements of the power system. The plurality of controllers may be configured to increase power for the plurality of power stages in the power device (e.g., using multiple power point tracking [MPPT] operations). As an example, the plurality of controllers (and/or other circuits/circuitries configured to increase power) may be synchronized (e.g., may share a communication bus and/or other method of sharing synchronization information) and may be configured to operate to generate one or more information signals and/or power signals (e.g., in order to reduce and/or cancel out ripples, for example, at an output of the power device). As an example, the plurality of controllers (and/or other circuits/circuitries configured to increase power) may be configured to perform interleaving while taking into account phase differences. The plurality of controllers (and/or other circuits/circuitries configured to increase power) may be configured to be synchronized and/or to synchronize one or more operations of the plurality of power stages (e.g., the plurality of controllers and/or other circuits/circuitries configured to increase power may be configured to cancel output ripples by controlling the pulse width modulation [PWM] of the plurality of power stages so that there is about a 180 degree phase difference, or another phase difference, between the outputs of the different power stages).

For example, the plurality of controllers may be configured to share the same earth/ground potential and/or communicate with one another and share data. The shared earth/ground potential may provide a path for the current to return to the respective power source/power stage. The shared earth/ground potential may also provide a similar reference voltage for a plurality of elements of the power system/power device which may facilitate communication between the plurality elements (e.g., fewer steps and/or other elements may be needed to allow communication than if the plurality of elements had different voltages for their reference voltages instead of the same shared earth/ground potential). A further example will be given below with reference to FIG. 3D.

As another example, the power device having a plurality of power stages may have a plurality of controllers and only a single shared auxiliary power circuit/unit. In this example also, data may be able to be obtained at relatively lesser voltage values (e.g., less than a threshold, for example, less than about 12 V, less than about 5 V, at about 0 V, and/or less than about 0 V), since one or more controller of the plurality of controllers may be configured to ensure that auxiliary power functions for the plurality of power stages of the power device are provided (e.g., by the single auxiliary power circuit/unit) while one or more other controller of the plurality of controllers may be configured to obtain data related to the power system even at relatively lesser voltage values (e.g., since the other one or more controller is configured to ensure that at any given time only one of the respective power source[s] is controlled to be less than an auxiliary threshold, for example, less than about 12 V, or less than about 5 V, etc.). As an example, data obtained at a relatively lesser voltage may be used to produce one or more tools (e.g., graphs, for example, one or more current-voltage [I-V] curves) that may be used to determine diagnostics related to one or more elements of the power system. The obtained parameter may be used to help determine a faulty and/or malfunctioning element of the power system (e.g., one or more switches/diodes, for example, a burnt diode). As another example, one or more one or more controller of the plurality of controllers may be used to provide auxiliary power functions for the plurality of power stages of the power device, while the single auxiliary power circuit/unit may be used to help one or more element of the power system (e.g., one or more controller) to perform a current-voltage operating point search and/or peak sweep/peak search (e.g., to determine an operating voltage value that may provide a maximum power output of one or more power sources). For example, the current-voltage operating point search and/or peak sweep/peak search may even include parameter data obtained at relatively lesser voltage values. For example, a slope of an I-V curve at low voltage values may provide indications of potential-induced degradation (PID). A controller receiving power from an auxiliary power converter connected to a single solar panel cannot obtain I-V operating point values for the single solar panel at a voltage below a certain threshold, for example, about 12 V or about 5 V, since the auxiliary converter might not be able to provide the controller with sufficient operational power when the solar panel outputs below the threshold (e.g., about 12 V or about 5 V).

As another example, a power device with a plurality of power stages may have a plurality of discharge/rapid shut down (RSD) circuits/circuitries (e.g., discharge circuits Dis1, Dis2, described herein below). One or more of the discharge/rapid shut down (RSD) circuits/circuitries may be configured to perform discharge at an input and/or output of one or more power stages and/or power source(s) while one or more other power stages and/or power source(s) continue to operate without discharge (e.g., one or more of the discharge/RSD circuits/circuitries do not perform discharge).

Providing a plurality of power stages in the same power device 106 while increasing the elements (e.g., the number of elements required even if the plurality of power stages were in separate power devices 106) may allow the power device 106 to be configured with additional functionalities. For example, a power device with a plurality of power stages may have additional bypass circuits/bypass diodes (e.g., more than may be provided if the plurality of power stages were in separate power devices 106). As an example, a plurality of bypass circuits/bypass diodes may be configured to bypass a single power stage, and one or more additional bypass circuits/bypass diodes may be configured to bypass a plurality of power stages. In some cases, this may advantageously enable bypassing of a single one of the converter(s)/power stage(s) where only a single power stage is underperforming and/or malfunctioning, and may enable bypassing of several converter(s)/power stage(s) where several converter(s)/power stage(s) are underperforming or malfunctioning while incurring losses associated with a single bypass device.

Figure 1B:
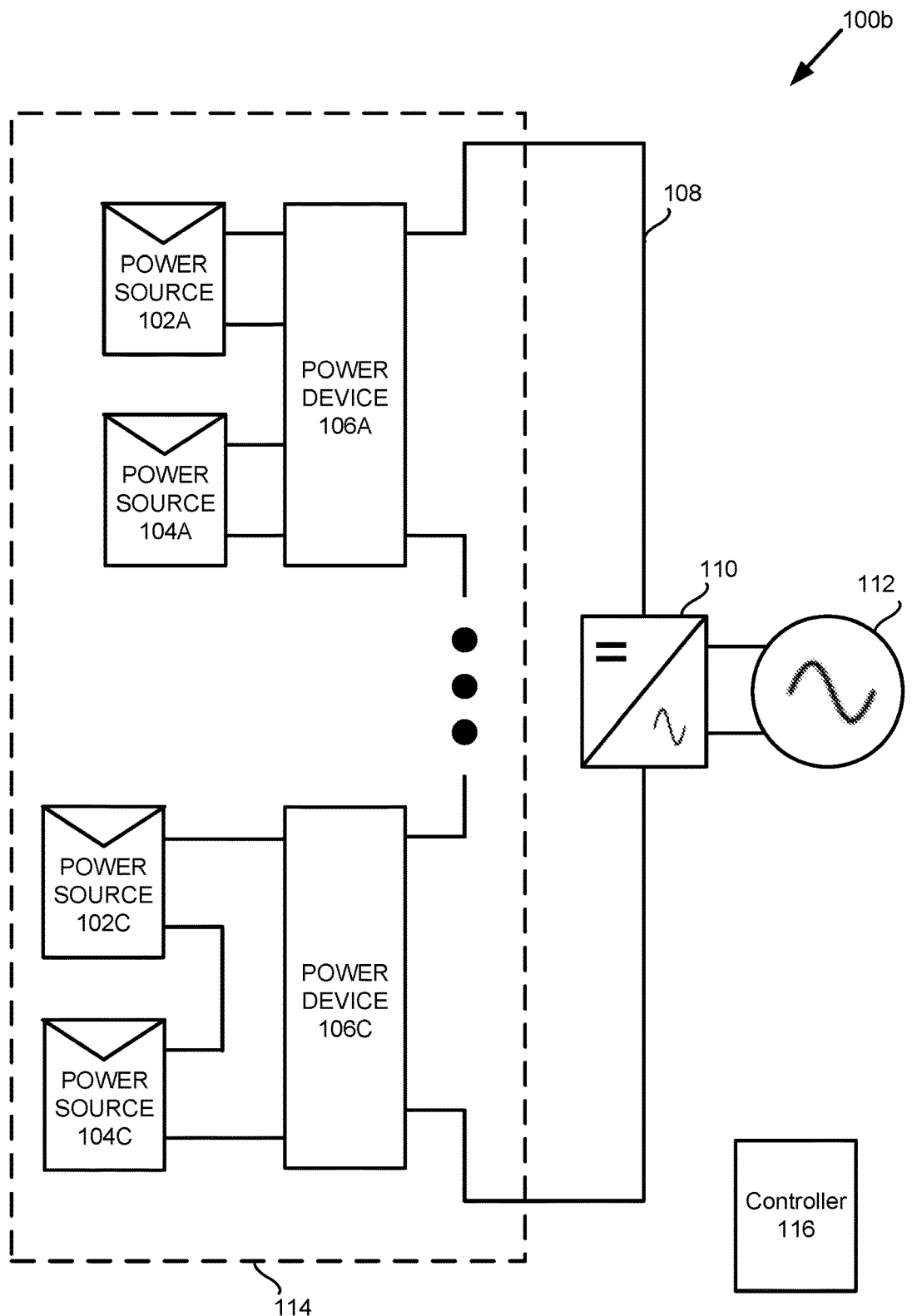
FIG. 1B shows a power system, in accordance with certain examples of the presently disclosed subject matter.

FIG. 1B shows a power system 100*b* according to examples of the present subject matter. Power system 100*b* may include a plurality of power devices 106 configured to be connected to at least one system power device 110.

Power system 100*b* shows may be similar to other power systems 100 shown herein, except that power system 100*b* shows that string 114 may include a plurality of power sources 102C, 104C that may be connected in series to a power device 106C.

Figure 2A:
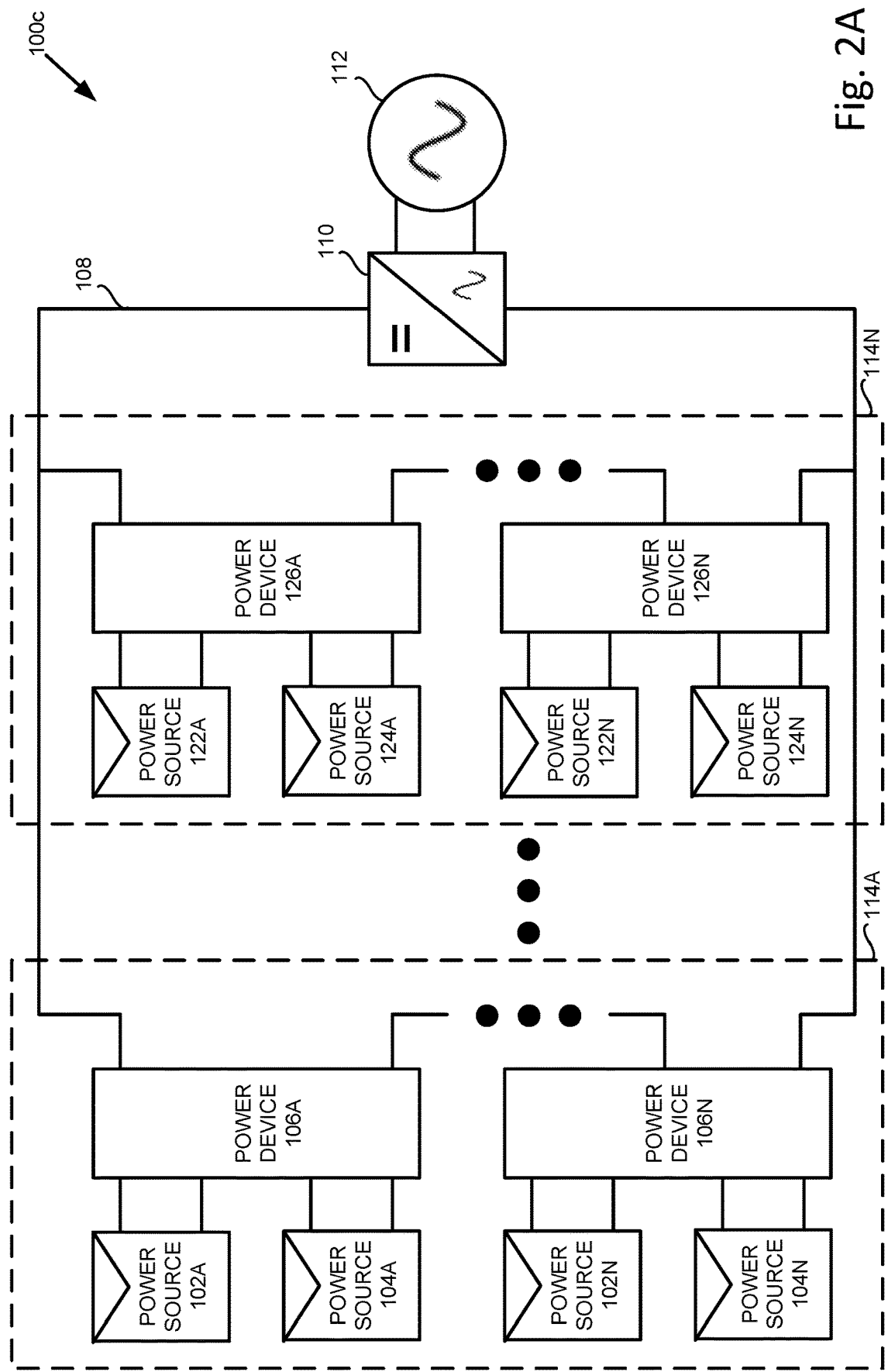
FIG. 2A shows a power system, in accordance with certain examples of the presently disclosed subject matter.

FIG. 2A shows a power system 100*c* according to examples of the present subject matter. Power system 100*c* may be similar to other power systems 100 shown herein, except that power system 100*c* shows that a power system 100 may include a plurality of series strings 114A, . . . , 114N of power devices connected in parallel via the bus 108 (e.g., a DC bus). The plurality of series strings 114A, . . . , 114N may be connected to one or more system power device 110 via the bus 108. Each series string 114A, . . . , 114N, may include one or more power devices 106A, . . . , 106N, 126A, . . . , 126N that have a plurality of power sources 102A, . . . , 104A, 102N, . . . , 104N, 122A, . . . , 124A, 122N, . . . , 124N, connected to them. Power sources 122, 124 may be similar to other power sources 102 shown herein. Power devices 126 may be similar to other power devices 106 shown herein.

Figure 2B:
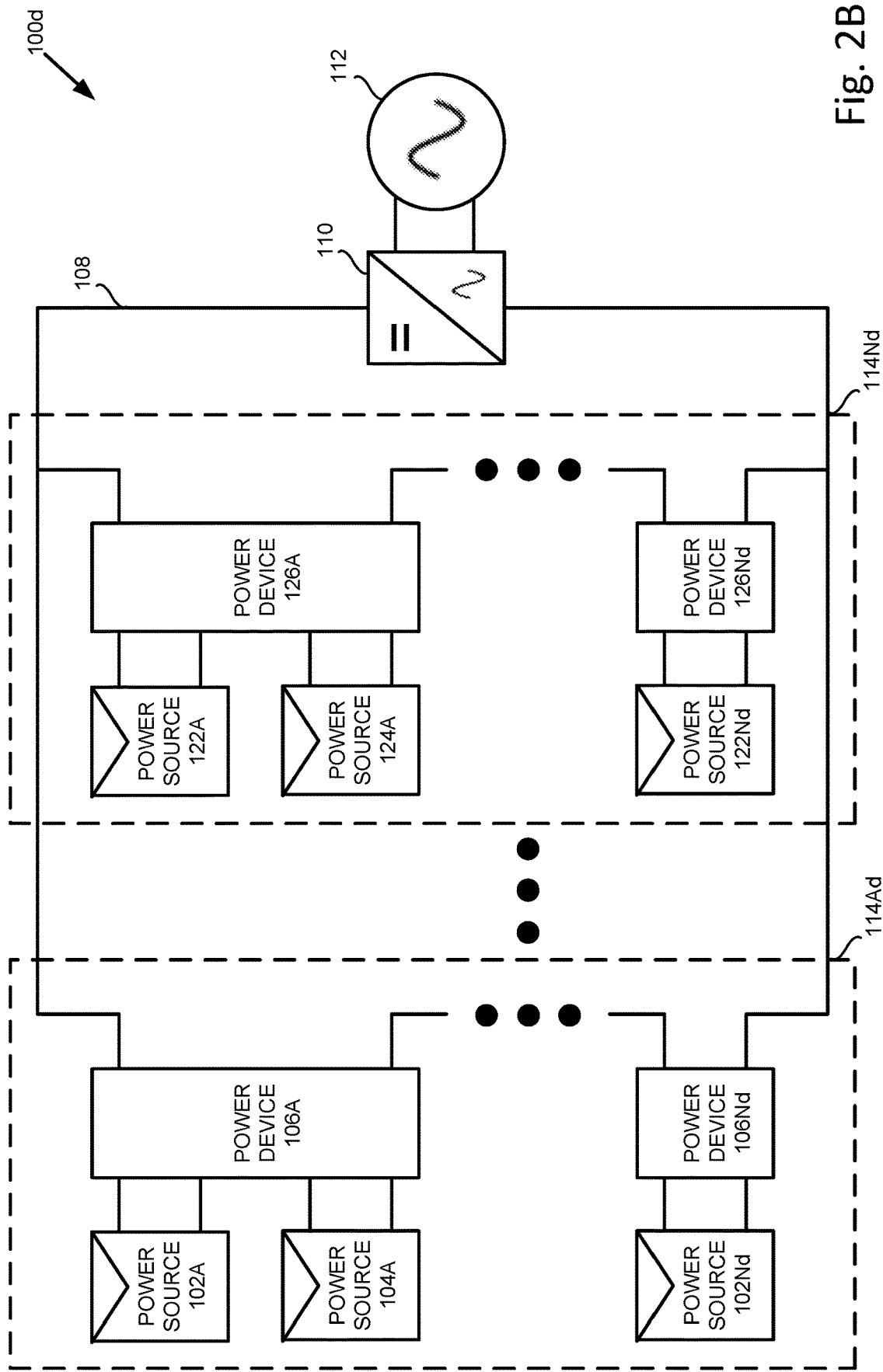
FIG. 2B shows a power system, in accordance with certain examples of the presently disclosed subject matter.

FIG. 2B shows a power system 100*d* according to examples of the present subject matter. Power system 100*d* may include a plurality of series strings 114Ad, . . . , 114Nd of power devices connected in parallel via the bus 108 (e.g., a DC bus). The plurality of series strings 114Ad, . . . , 114Nd may be connected to one or more system power device 110 via the bus 108. Power system 100*d* may be similar to other power systems 100 shown herein, except that power system 100*d* shows that each series string 114Ad, . . . , 114Nd, may include one or more power devices 106A, 126A connected to a plurality of power sources 102A, 104A, 122A, 124A, and one or more power devices 106Nd, 126Nd connected to a single power source 102Nd, 122Nd. Although the one or more power devices 106Nd, 126Nd are shown connected to a single power source 102Nd, 122Nd, these power devices 106Nd, 126Nd may each have a plurality of power stages as shown in various other power devices shown herein. These power devices 106Nd, 126Nd while shown connected to a single power source 102Nd, 122Nd may be configured to be connected to a plurality of power sources similar to other power devices shown herein. For example, these power devices 106Nd, 126Nd may include a plurality of inputs that are not shown in use in FIG. 2B.

FIG. 3A to FIG. 6B show examples of various power devices 106 according to examples of the present subject matter. The power devices 106 shown in FIG. 3A to FIG. 6B may be part of the various power systems 100 shown in FIG. 1A to FIG. 2B. FIG. 3A to FIG. 3H show examples of power devices 106 with series-connected power stages 201, 202 according to examples of the present subject matter.

Figure 3A:
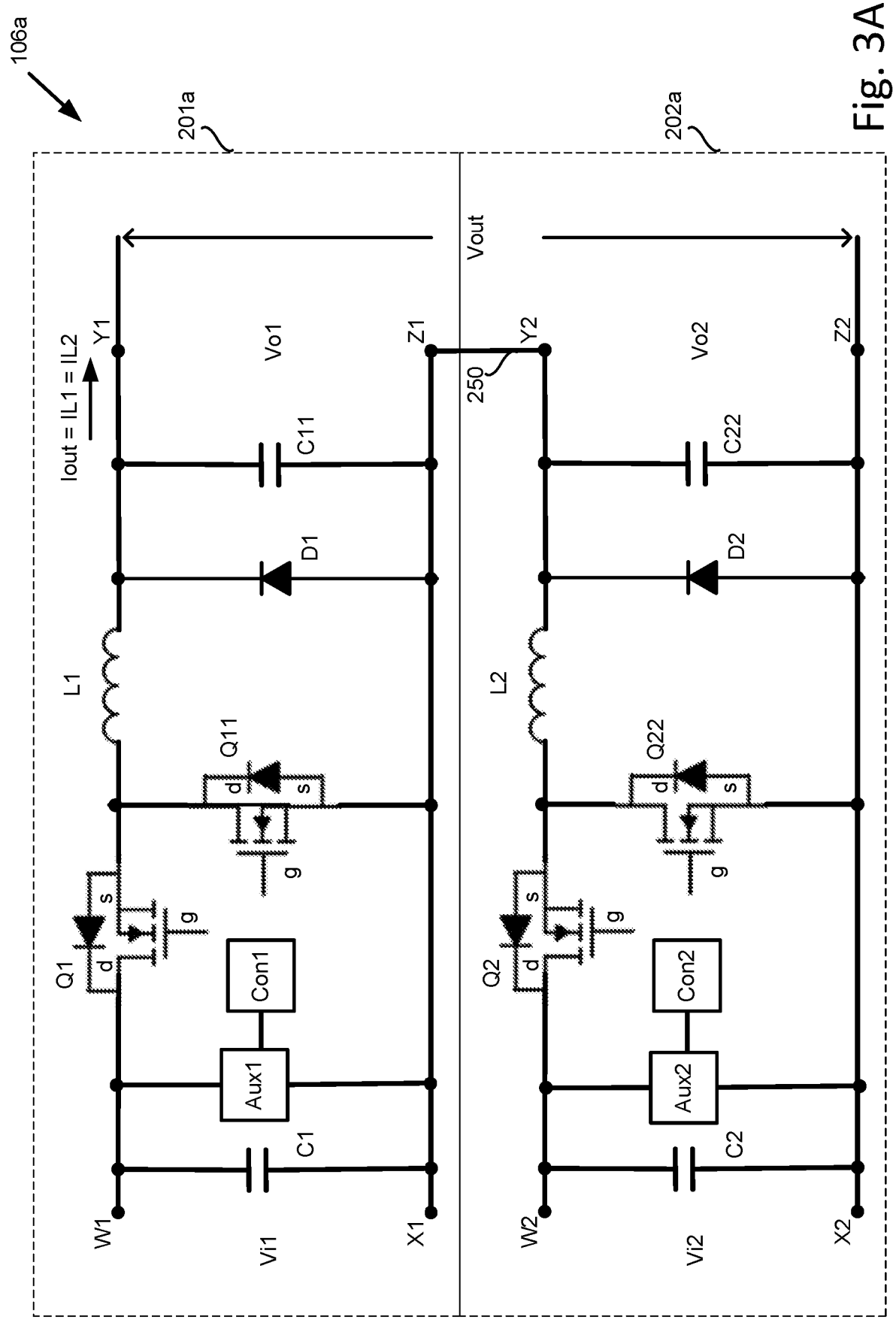
FIG. 3A shows a power device, in accordance with certain examples of the presently disclosed subject matter.

FIG. 3A shows a power device 106a according to examples of the present subject matter. Power device 106a includes a plurality of power stages 201a, 202a. Each power stage 201a, 202a is configured to be connected to at least one respective power source. The respective power source may be a single power source or a plurality of power sources (e.g., connected in series and/or parallel, for example, as shown in FIGS. 7-10). For example, a first power source may be connected to input terminals W1, X1, of a first power stage 201a, and a second power source may be connected to input terminals W2, X2, of a second power stage 202a.

As mentioned above, power stage 201a, 202a may be, for example, one or more: DC to DC converter(s) (e.g., buck converters, boost converters, buck/boost converters, buck+ boost converters, Cuk converters, etc.), DC to AC converter(s)/inverter(s), micro-inverter(s), flyback converters, etc.

In the example of FIG. 3A, power stages 201a, 202a are shown as DC to DC buck converters (in a buck configuration) that are be configured to receive power on a first plurality of terminals. The first plurality of terminals may be a pair of terminals, including a first input terminal W1, W2 and a second input terminal X1, X2, which may receive a respective input voltage Vi1, Vi2 from respective power sources (e.g., one or more PV modules). The buck converter (also known as a step-down converter) is a DC to DC power converter that steps down the respective first input voltage Vi1, Vi2 across the first pair of terminals W1, W2 and X1, X2 to a respective reduced second output voltage Vo1, Vo2 across a second plurality of terminals which may be a pair of terminals, including a first output terminal Y1, Y2 and a second output terminal Z1, Z2. The buck converter may convert current flowing between the respective first pair of terminals W1, W2 and X1, X2 to an increased current flowing between the respective second pair of terminals Y1, Y2 and Z1, Z2.

The respective first input terminal W1, W2 may be connected to the drain (d) of a respective first switch Q1, Q2. The respective first input terminal W1, W2 may also be connected to a first terminal of respective input capacitors C1, C2, and a first terminal of respective auxiliary power units Aux1, Aux2.

The respective second input terminal X1, X2 may be connected to a second terminal of respective input capacitors C1, C2, a second terminal of respective auxiliary power units Aux1, Aux2, the source (s) of a respective second switch Q11, Q22, a first terminal of a respective diode D1, D2, a first terminal of respective output capacitors C11, C22, and to respective first output terminals Z1, Z2. Diode D1, D2 may be a bypass diode, and the first terminal of diode D1, D2 may be an anode of the diode D1, D2. The respective second input terminal X1, X2 may also be connected to a terminal of respective controllers, Con1, Con2 (e.g., low voltage [LV] controllers) (similar to the connection of terminals X1, X2 to respective controllers Con1, Con2, shown in FIG. 4C).

Auxiliary power units Aux1, Aux2 may be connected to the respective controllers, Con1, Con2 (e.g., using any appropriate connection, for example, electrical, physical, communication, etc.).

Controllers Con1, Con2 may be connected to the gates (g) of the respective switches Q1, Q11, Q2, Q22 (e.g., using any appropriate connection, for example, electrical, physical, communication, etc.).

Auxiliary power may be used to power a controller configured to activate one or more switches (e.g., Q1, Q11, Q2, Q22), for example, in a case where one or more power source is underproducing/malfunctioned. Auxiliary power may be provided by voltage Vi1, voltage Vi2, and/or an external power source, external to the power device 106a. For example, the external power source may be power from a utility grid, a storage device, a different power source, etc.

The drain (d) of the respective second switch Q11, Q22 may be connected to the source (s) of the respective first switch Q1, Q2, and to a first terminal of a respective inductor L1, L2.

A second terminal of the respective inductor L1, L2 may be connected to a second terminal of respective diode D1, D2, a second terminal of respective output capacitor C11, C22, and respective second output terminals Y1, Y2. The second terminal of the respective diode D1, D2, may be the cathode of the respective diode D1, D2.

Switches Q1, Q11, Q2, Q22 may be, for example, one or more: field effect transistor (FET), metal-oxide-semiconductor field-effect transistor (MOSFET), bipolar junction transistor (BJT), insulated-gate bipolar transistor (IGBT), Silicon Carbide (SiC) switch, Gallium Nitride (GaN) switch, etc. Switches Q1, Q11, Q2, Q22 are shown in FIG. 3A as MOSFETs. Switches Q1, Q11, Q2, Q22 may be active switches (e.g., MOSFETs where switch Q11, Q22 is controlled to be ON when switch Q1, Q2 is OFF, and vice versa), relays, and/or the like. In some implementations, switches Q11, Q22 may be replaced with a diode corresponding to the parasitic diode shown as part of switches Q11, Q22.

Power stages 201a, 202a may be connected in a series connection (e.g., having outputs connected via connection 250, for example, second output terminal Z1 of the first power stage 201a may be connected to first output terminal Y2 of the second power stage 202a). The total output voltage Vout of power device 106a may be the combination of the output voltage Vo1 of the first power stage 201a and the output voltage Vo2 of the second power stage 202a (e.g., the total output voltage Vout may be about equal to output voltage Vo1 added together with output voltage Vo2).

The output current (Iout) of power device 106a may be the shared output current (Iout) of the first power stage 201b and the second power stage 202b (e.g., Tout may be about equal to the current of the first inductor L1 [IL1] which may be about equal to the current of the second inductor L2 [IL2]).

Power device 106a may be configured to control the output of power device 106a (e.g., one or more output voltage Vo1, Vo2, Vout).

Alternatively (or additionally, in case of a buck+boost converter), a boost converter (e.g., power stage 202ad in FIG. 3D) may be used for one or more of the power stages 201a, 202a. A boost converter (also known as a step-up converter) is a DC to DC power converter which steps up a respective first voltage Vi1, Vi2 at the first pair of input terminals W1, W2 and X1, X2 to a second voltage Vo1, Vo2 at the second pair of output terminals Y1, Y2 and Z1, Z2. The boost converter may accordingly convert the current flowing between the first pair of input terminals W1, W2 and X1, X2 to a reduced current between the second pair of output terminals Y1, Y2 and Z1, Z2.

Although only two power stages 201a, 202a are shown in FIG. 3A and other figures, this is for the sake of simplicity, and it is to be understood that the power devices 106 may include a greater number of power stages (e.g., more than two power stages, for example, connected using parallel and/or series connections).

Figure 3B:
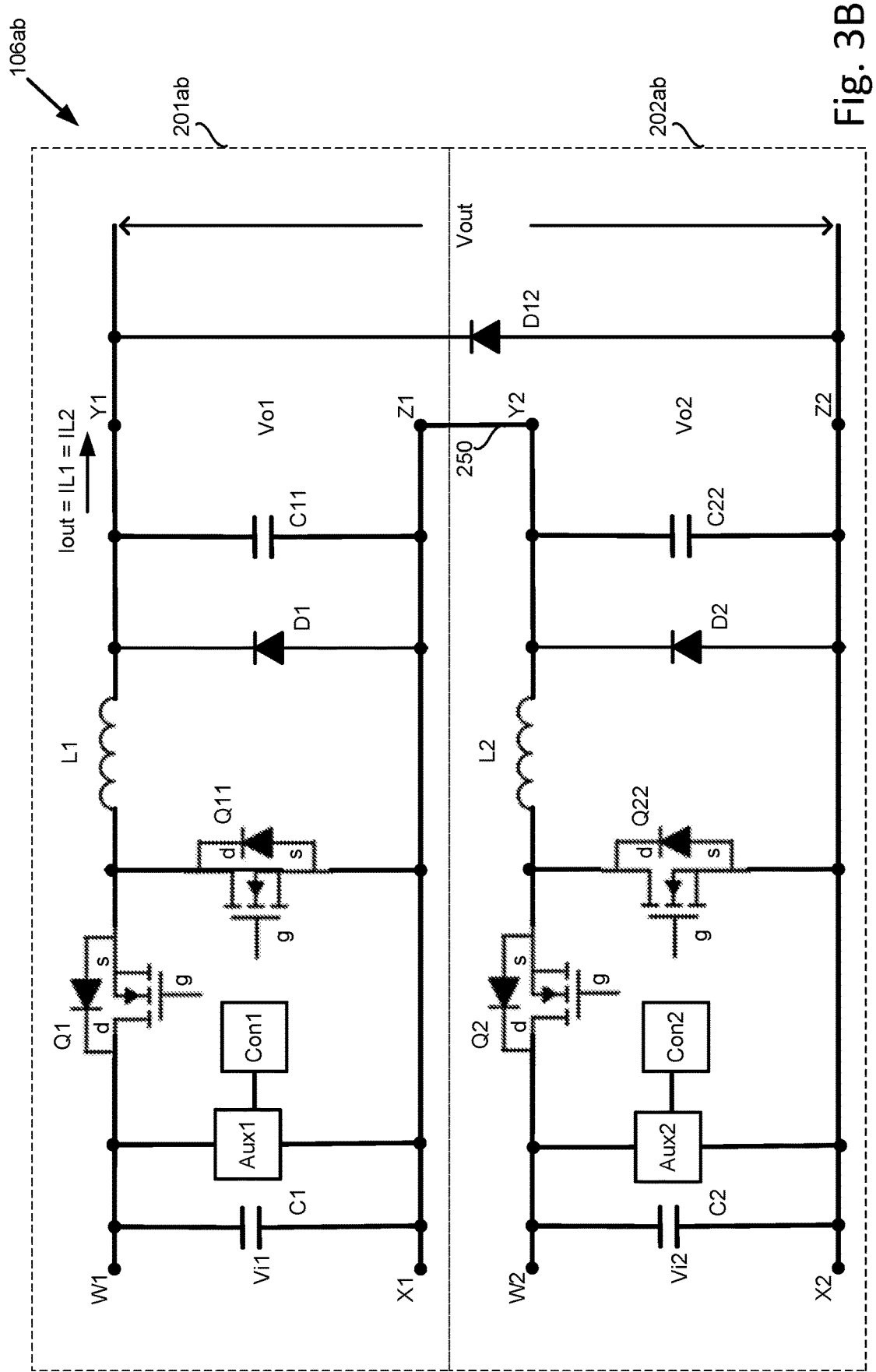
FIG. 3B shows a power device, in accordance with certain examples of the presently disclosed subject matter.

FIG. 3B shows a power device 106ab according to examples of the present subject matter. Power device 106ab may include a plurality of power stages 201ab, 202ab connected in series at the output of power device 106ab. Power device 106ab may be similar to other power devices shown herein except that power device 106ab shows that the power device 106 may include an additional bypass diode D12. The additional bypass diode D12 is shown connected across the output of power device 106ab. Bypass diode D12 may be configured to bypass the plurality of power stages 201ab, 202ab (e.g., in response to one or more bypass conditions, for example, if a power source and/or a power device is malfunctioning or underproducing). One possible advantage of having an additional bypass diode D12 is that in a situation where both power stages 201ab, 202ab are bypassed, then in a situation where there are only respective bypass diodes D1, D2 (e.g., as shown in FIG. 3A) then there may be losses (e.g., power losses) according to both of the diodes D1, D2. However in a case where there is also an additional bypass diode D12 (which may be a similar diode as each of the diodes D1, D2, e.g., as shown in FIG. 3B) then if both power stages 201ab, 202ab are bypassed by the additional diode D12 then the power losses may be less than if both alternative bypass diodes D1, D2 were active (e.g., the losses may even be half as much if all of the diodes D1, D2, D12 are similar diodes). In addition, power device 106ab may be configured so that in a situation where both power stages 201ab, 202ab are to be bypassed, then the additional diode D12 may be configured to perform the bypass instead of both of the respective diodes D1, D2 together.

Figure 3C:
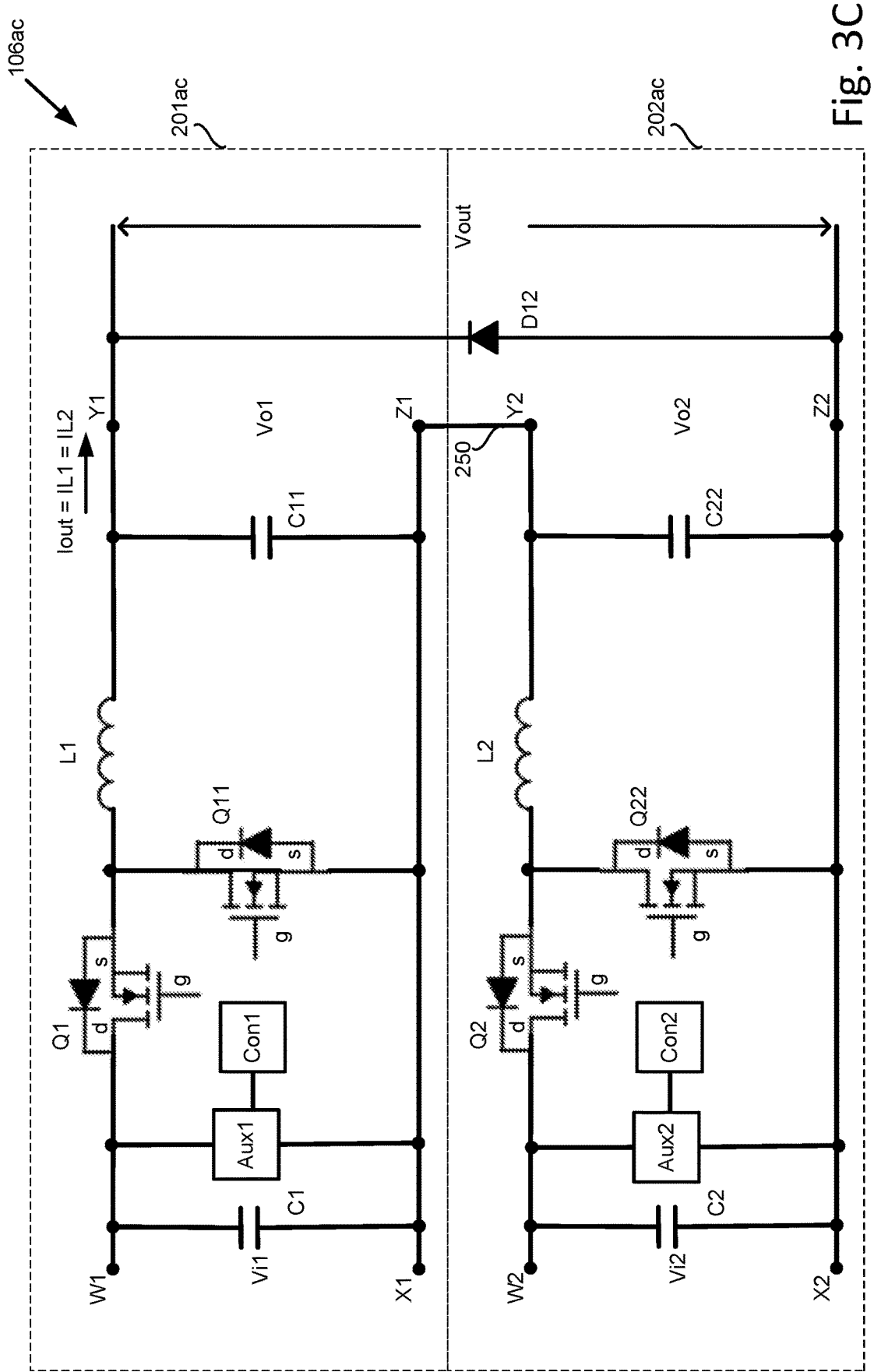
FIG. 3C shows a power device, in accordance with certain examples of the presently disclosed subject matter.

FIG. 3C shows a power device 106ac according to examples of the present subject matter. Power device 106ac may include a plurality of power stages 201ac, 202ac connected in series at the output of power device 106ac. Power device 106ac may be similar to other power devices 106 shown herein except that power device 106ac shows that the power device 106 may include a shared bypass diode D12. The shared bypass diode D12 is shown connected across the output of power device 106a. Bypass diode D12 may be configured to bypass the plurality of power stages 201ac, 202ac (e.g., in response to one or more bypass conditions). In some cases, power device 106ac might not include respective bypass diodes D1, D2 for each of the respective power stages 201ac, 202ac.

Figure 3D:
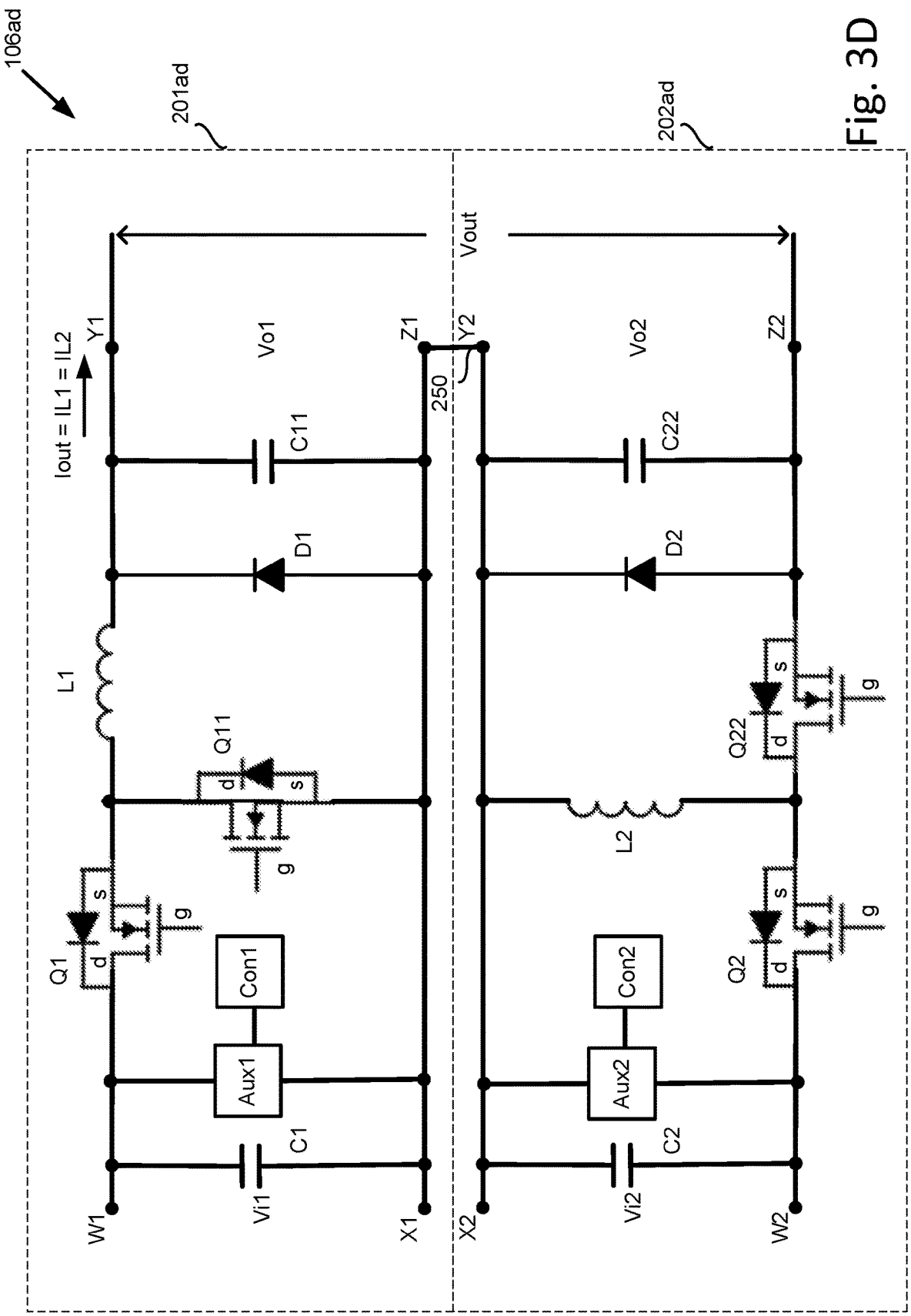
FIG. 3D shows a power device, in accordance with certain examples of the presently disclosed subject matter.

FIG. 3D shows a power device 106ad according to examples of the present subject matter. Power device 106ad may include a plurality of power stages 201ad, 202ad connected in series at the output of power device 106ad. Power device 106ad may be similar to other power devices 106 shown herein, except that power device 106ad shows that the power device 106 may include one or more power stages 201ad, 202ad that are boost converters. For example, power device 106ad may be an inverting buck boost device having a first power stage 201ad that is a buck converter and a second power stage 202ad that is a boost converter. In power device 106ad, first power stage 201ad and second power stage 202ad may be connected with a shared earth/ground potential. Shared earth/ground potential may provide a path for the current to return to the respective power source/power stage, and may facilitate communication between a plurality of elements (e.g., fewer steps and/or other elements may be needed to allow communication than if the plurality of elements had different voltages for their reference voltages instead of the same shared earth/ground potential). For example, in the power devices 106a/106ab/106ac which include a plurality of power stages 201, 202 connected in series at the output of the power device 106, the reference voltage of one of the converters 201 (e.g., at the auxiliary unit Aux1) may be different than the reference voltage of another one of the converters 202 (e.g., at the auxiliary unit Aux2). As an example, if the output voltage of each power stage 201, 202 is about 80 V, then the reference voltage of the auxiliary unit Aux2 of power stage 202 may be about 0 V, while the reference voltage of the auxiliary unit Aux1 of power stage 201 may be about 80 V (e.g., about the voltage value of the output voltage Vo2 of power stage 202). This may complicate communication between the plurality of power stages 201, 202 and may demand additional elements (not shown) in order to facilitate communication between the plurality of power stages 201, 202. On the other hand, in power device 106ad which may have a shared earth/ground potential for the plurality of power stages 201ad, 202ad, then the reference voltage of the auxiliary unit Aux2 of power stage 202ad may be about 0 V (or another shared reference voltage, e.g., 10 V), while the reference voltage of the auxiliary unit Aux1 of power stage 201 may also be about 0 V (or another shared reference voltage, e.g. about 10 V) which is about the same reference voltage of the other auxiliary unit Aux2. This may facilitate communication between elements of the power device 106ad (e.g., communication between the respective controllers Con1, Con2).

Figure 3E:
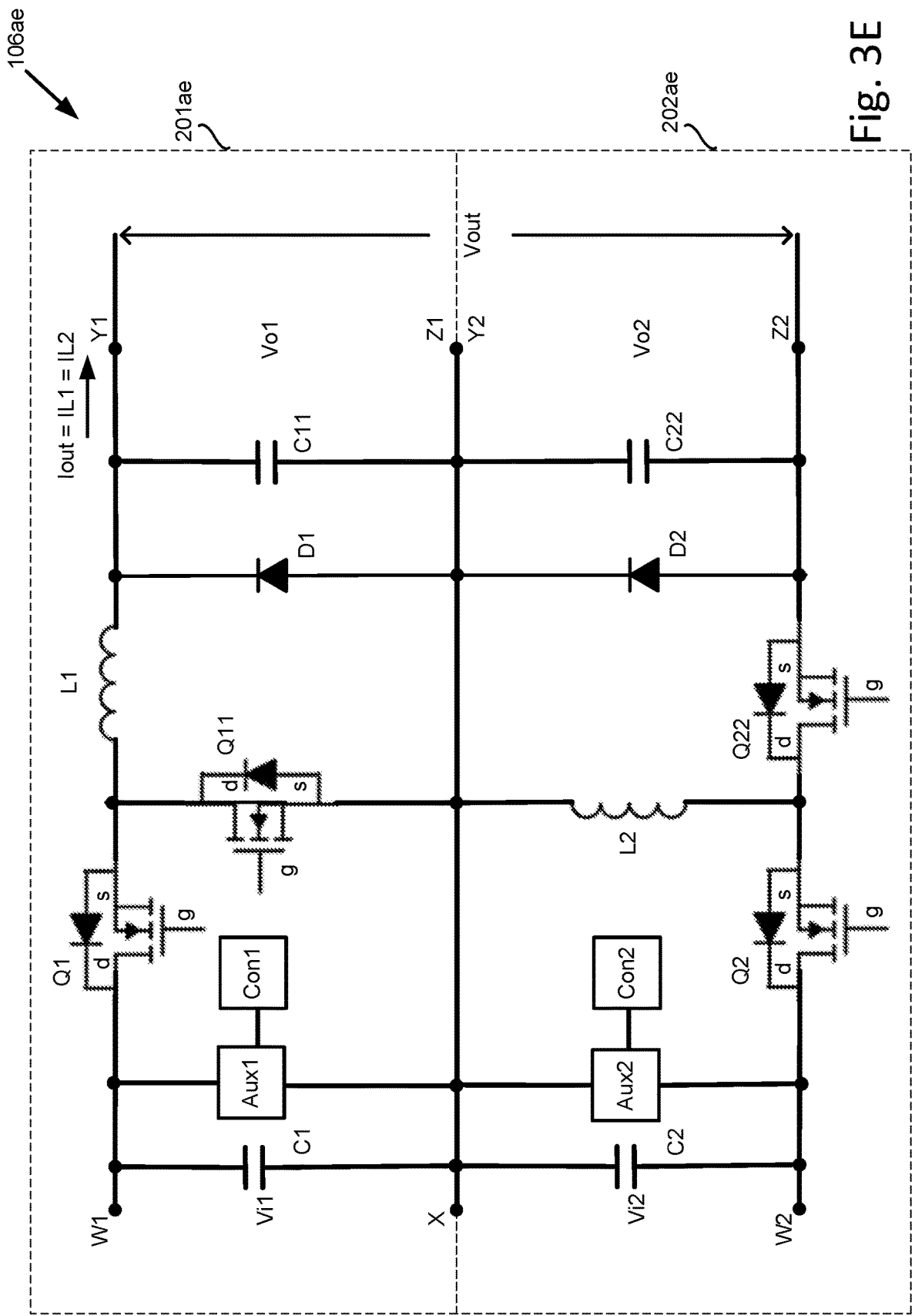
FIG. 3E shows a power device, in accordance with certain examples of the presently disclosed subject matter.

FIG. 3E shows a power device 106ae according to examples of the present subject matter. Power device 106ae may include a plurality of power stages 201ae, 202ae connected in series at the output of power device 106ae. Similar to power device 106ad, power device 106ae may include a first power stage 201ae and a second power stage 202ae connected in a configuration with a shared earth/ground potential.

Figure 3F:
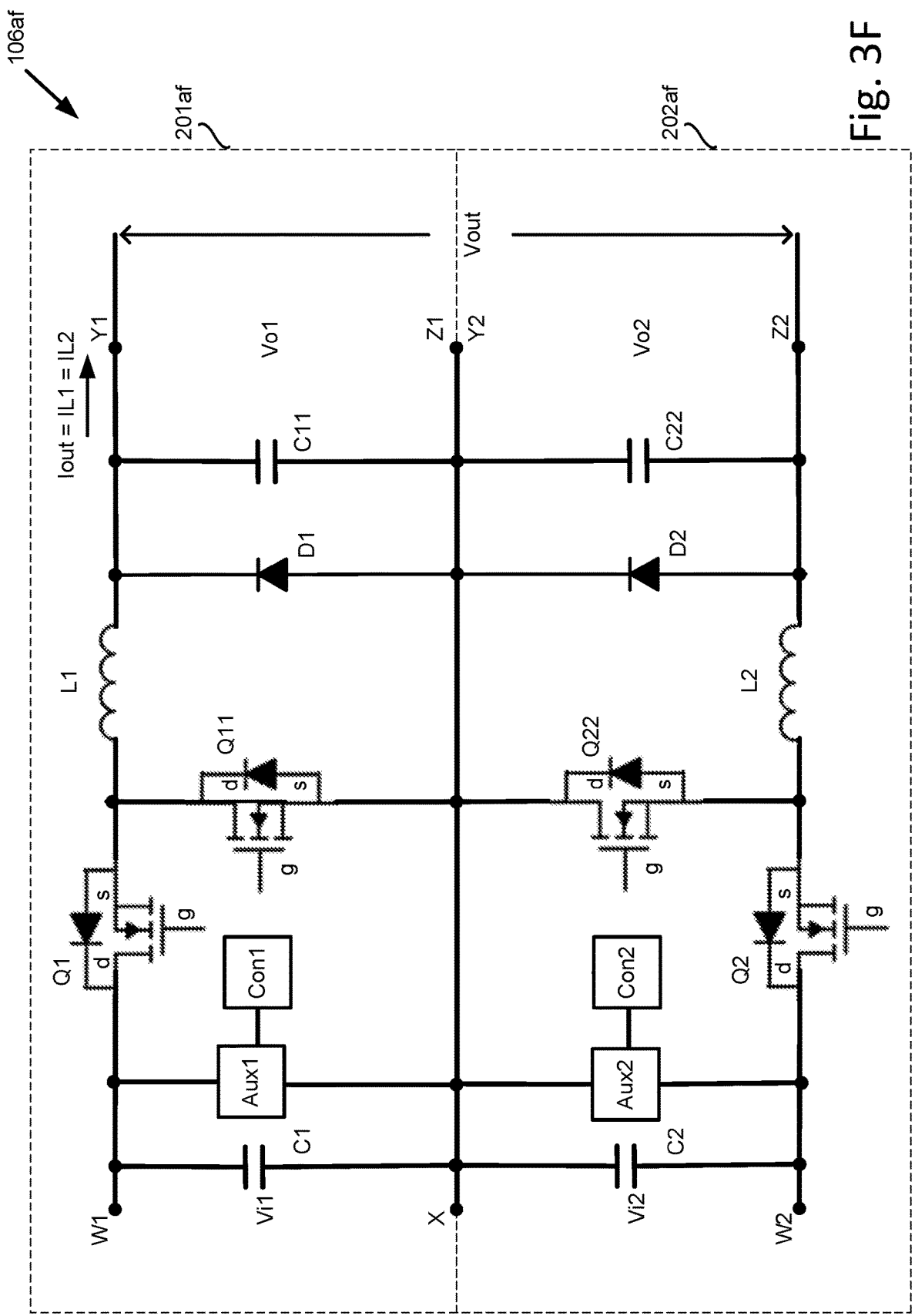
FIG. 3F shows a power device, in accordance with certain examples of the presently disclosed subject matter.

FIG. 3F shows a power device 106af according to examples of the present subject matter. Power device 106af may include a plurality of power stages 201af, 202af connected in series at the output of power device 106af. Power device 106af may include a first power stage 201af and second power stage 202af connected in a mirror configuration. A mirror configuration may help provide a shared earth/ground potential (some possible benefits of which may be detailed above). Similar to power devices 106a/106ab/106ac, power device 106af may include a plurality of power stages 201af, 202af that are buck converters.

Figure 3G:
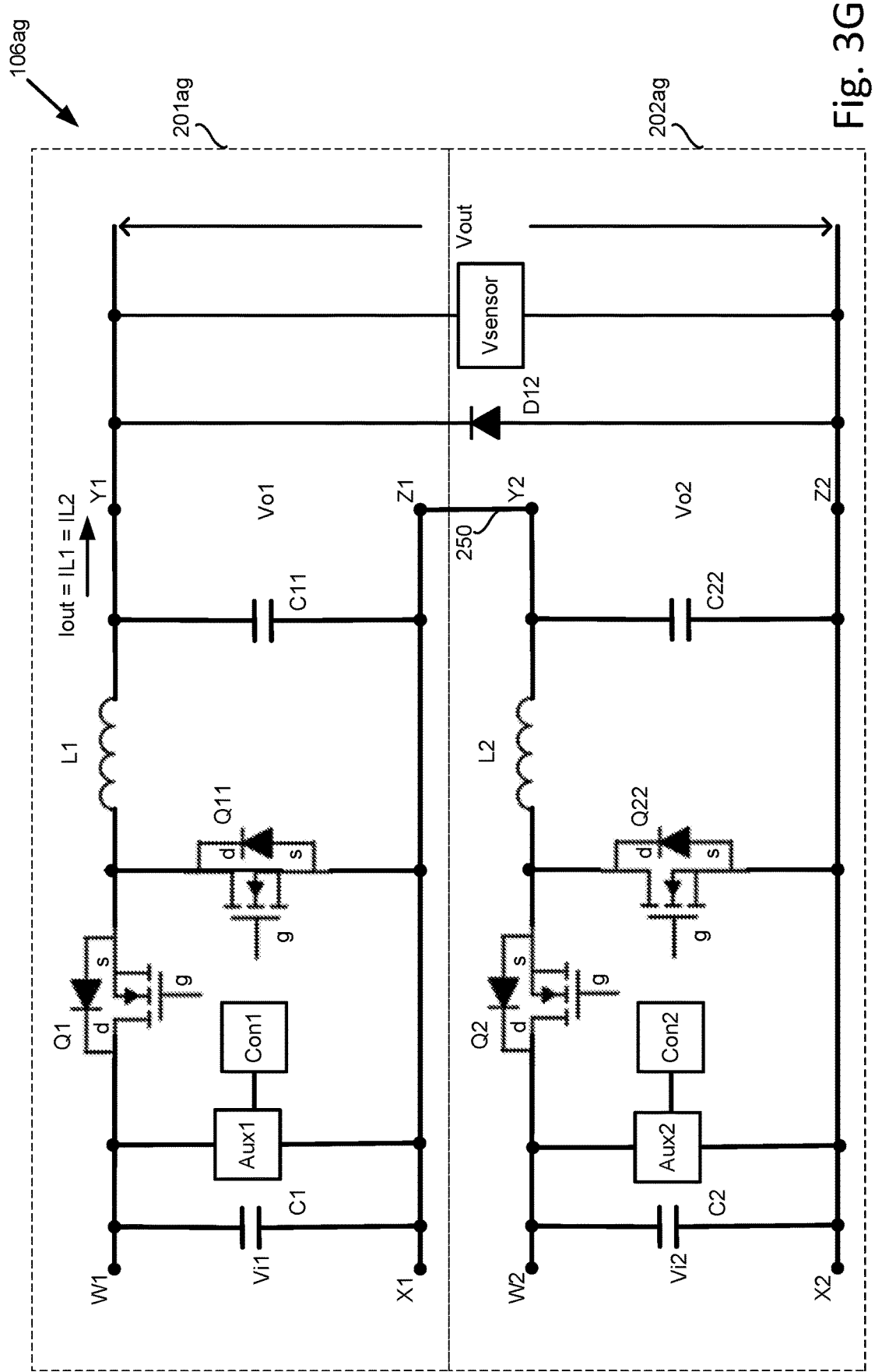
FIG. 3G shows a power device, in accordance with certain examples of the presently disclosed subject matter.

FIG. 3G shows a power device 106ag according to examples of the present subject matter. Power device 106ag may include a plurality of power stages 201ag, 202ag connected in series at the output of power device 106ag. Power device 106ag may be similar to other power devices 106 shown herein, except that power device 106ag shows that the power device 106 may include a shared voltage sensor Vsensor. The shared voltage sensor may be arranged across the output terminals of the power device 106ag, and configured to measure the total combined voltage across the series of power stages 201ag, 202ag. If the plurality of power stages 201ag, 202ag were in separate power devices, then a plurality of voltage sensors may be used instead of the shared voltage sensor Vsensor.

Figure 3H:
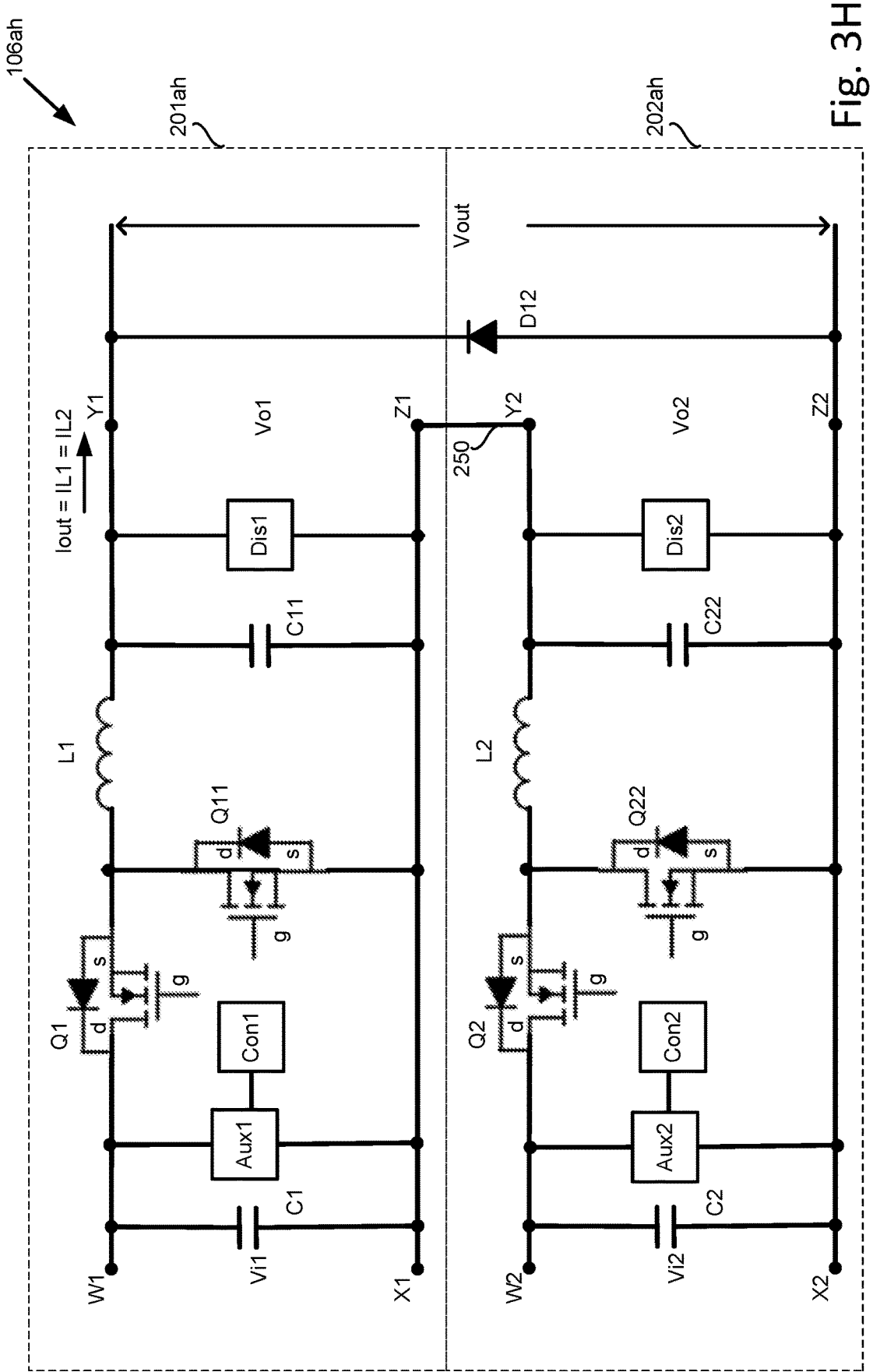
FIG. 3H shows a power device, in accordance with certain examples of the presently disclosed subject matter.

FIG. 3H shows a power device 106ah according to examples of the present subject matter. Power device 106ah may include a plurality of power stages 201ah, 202ah connected in series at the output of power device 106ah. Power device 106ah may be similar to other power devices 106 shown herein, except that power device 106ah shows that the power device 106 may include a plurality of discharge circuits Dis1, Dis2. Each discharge circuit may include one or more discharge resistors and one or more discharge switches (e.g., similar to discharge resistor R and discharge switch Q shown in FIG. 4E). Each discharge circuit Dis1, Dis2 may be arranged across a respective output of one of the power stages 201ah, 202ah, and configured to perform discharge for that respective power stage 201ah, 202ah (e.g., each discharge circuit may operate independently; for example, each discharge circuitry may be controlled by one or more controllers to perform discharge separately from one another based on/in response to one or more discharge conditions [e.g., a voltage value above a certain threshold, disconnect of one or more switches, etc.] related to the respective power source that the power stage is connected to).

FIG. 4A to FIG. 6B show examples of power devices 106 with parallel-connected power stages 201, 202 according to examples of the present subject matter.

Figure 4A:
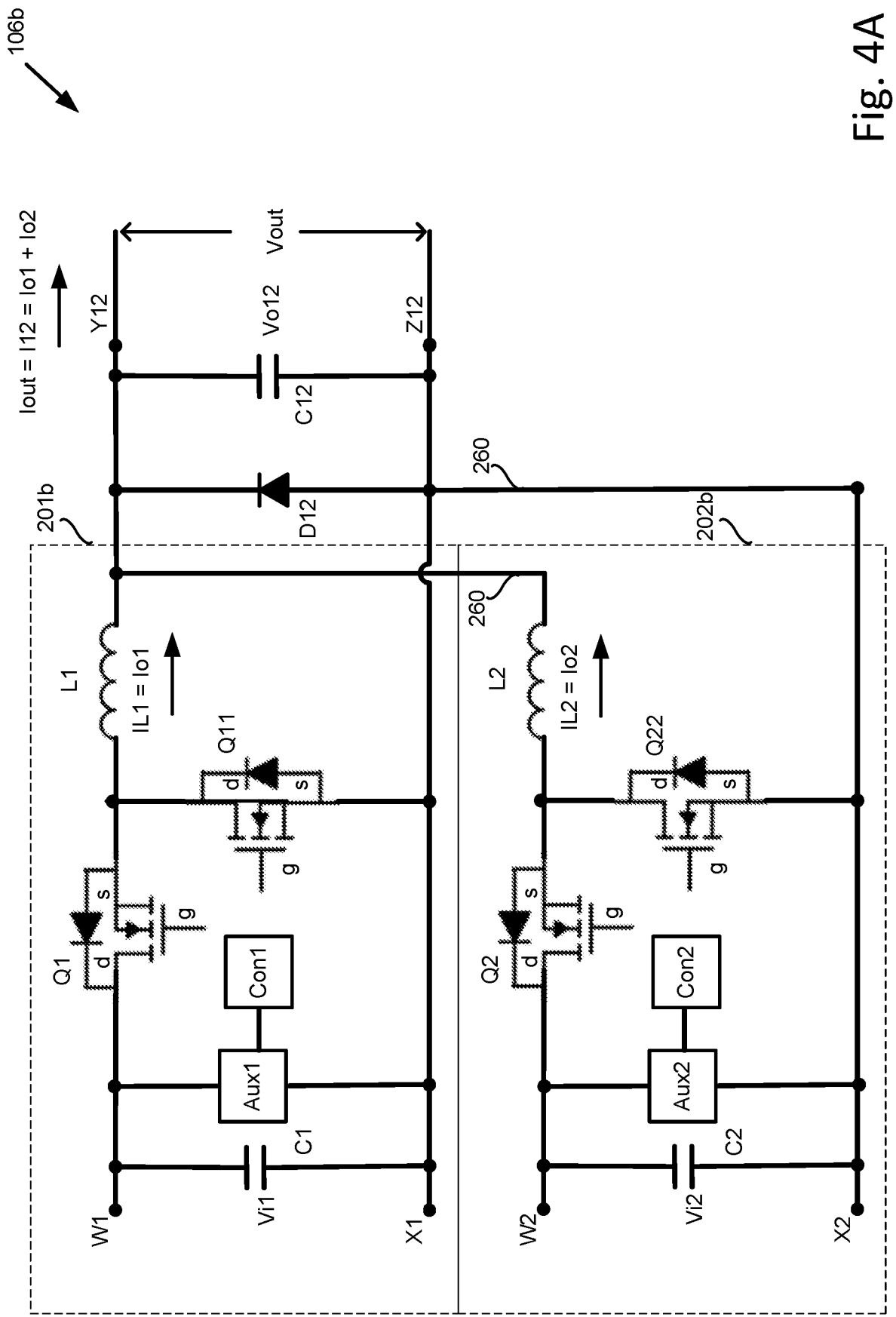
FIG. 4A shows a power device, in accordance with certain examples of the presently disclosed subject matter.

FIG. 4A shows a power device 106b according to examples of the present subject matter. Power device 106b may include a plurality of power stages 201b, 202b configured to be connected to at least one respective power source. The respective power source may be a single power source or a plurality of power sources (e.g., connected in series and/or parallel, for example, as shown in FIGS. 11-14). For example, a first power source may be connected to input terminals W1, X1, of a first power stage 201b, and a second power source may be connected to input terminals W2, X2, of a second power stage 202b.

As mentioned above, power stage 201b, 202b may be, for example, one or more: DC to DC converter(s) (e.g., buck converters, boost converters, buck/boost converters, buck+boost converters, Cuk converters, etc.), DC to AC converter(s)/inverter(s), micro-inverter(s), flyback converters, etc.

In the example of FIG. 4A, power stages 201b, 202b are shown as DC to DC buck converters (in a buck configuration), as described above in detail with regards to FIG. 3A.

Unlike power stages 201a, 202a of power device 106a, power stages 201b, 202b may be connected in a parallel connection (e.g., with the output of the first power stage 201b connected in parallel to the output of the second power stage 202b, for example, the outputs may be connected in parallel through a pair of connections 260). The output voltage Vout of power device 106b may be the shared output voltage Vo12 of the first power stage 201b and the second power stage 202b (e.g., the output voltage Vout may be about equal to the output voltage of the first power stage 201b which may be about equal to the output voltage of the second power stage 202b). This relatively lesser output voltage of the parallel connection (compared to the series connection) may allow the power device 106b to be configured to be connected to more power sources (e.g., PV modules, strings of PV modules, etc., for example, more than in the case of the series connection which may have a greater total output voltage for the same number of power sources). The shared output voltage Vo12 may be a voltage across terminals Y12, Z12. A diode D12 and/or capacitor C12 may be connected between terminals Y12, Z12.

The total output current Tout of power device 106b may be the combination of the output current Io1 of the first power stage 201b and the output current Io2 of the second power stage 202b (e.g., the total output current Tout may be about equal to output current Io1 added together with output current Io2). The combined output current of the parallel connection (compared to the series connection) may allow the power device 106b to be configured to output a relatively greater current (for example, greater than in the case of the series connection which may have a lesser total output current for the same number of power sources). For example, in the case where a first output current Io1 is about 20 A and a second output current Io2 is about 20 A, then for the parallel connection the total output current Tout might be about 40 A. In the case of the series connection the output current Tout might be about equal to the first output current IL1 and about equal to the second output current IL2, so the output current Tout might be about 20 A. As an example, if an output current Tout of 20 A was desired for the parallel connection, then power device 106b may include lesser inductors L1, L2 than may be used in the series connection, since each inductor L1, L2 in this case might only be required to output about half of the desired current, for example, if the first output current Io1 is about 10 A and the second output current Io2 is about 10 A, then the total output current Tout for the parallel connection might be about 20 A (e.g., Iout=Io1+Io2=10 A+10 A=20 A). Using lesser inductors which each output a relatively lesser current than the series connection may reduce losses (e.g., power losses, for example, less losses than in the case of the series connection). A power device with a plurality of power stages 201b, 202b having their outputs connected in a parallel connection may have less losses due to Direct Current Resistance (DCR) (e.g., the resistance of an inductor which may be the result of the resistance of the wire used in the winding) than if the outputs were connected in a series connection. As an example if the DCR for each inductor is about 2 mOhm, then the power loss due to DCR may be about 2 mOhm*I^2 (e.g., DCR*I^2). If in the series connection two inductors L1, L2 are required to have a current I of about 20 A, whereas in the parallel connection two inductors L1, L2 each having a current I of about 10 A are required, then the power loss due to DCR may be about four times less in the case of the parallel connection as opposed to the series connection (e.g., Iparallel^2/Iseries^2=10^2/20^2=100/400=1/4).

Power device 106b may be configured to control the output of power device 106b (e.g., one or more output current Io1, Io2, Tout) using one or more controller.

One or more of the power stages may be configured to compensate for one or more of the other power stages. For example, if one or more of the power stages are connected to one or more power sources that are experiencing a lesser production (e.g., due to malfunction, shading, etc.) then one or more of the other power stages may be configured to help compensate for the underperforming converter(s)/power stage(s). As an example, the output current of each power stage may be controlled to help compensate for the underperforming converter(s)/power stage(s) (e.g., by controlling the first output current and/or the second output current, and/or by controlling the output voltage Vout of the power device, for example, if system power device 110 is a non-fixed voltage inverter). For example, if a desired output current Tout is about 40 A, and a first power stage is capable of producing only about 200 W, while a second power stage is capable of producing about 600 W, then the second power stage may be configured/controlled to produce an output current Io2 of about 30 A, while the first power stage may be configured/controlled to produce an output current Io1 of about 10 A, thereby providing a total output current Tout of about 40 A (e.g., Iout=Io1+Io2=10 A+30 A=40 A).

A power device 106*b* that may control the total output current Tout may be configured to control the output current according to requirements of the load (e.g., the grid, motor, etc.) and/or the storage device (e.g., battery) connected to the power device 106*b*. For example, the power device may be configured to provide a relatively greater output current Tout when connected to/charging a storage device, and to provide a relatively lesser current when connected to a load requiring a relatively lesser current. A power device 106*b* may control the total output current Tout by controlling input voltage at the input of power device 106*b* to be a certain value, and upon setting the input voltage, the input current to power device 106*b* may be about equal to the total power provided to power device 106*b*, divided by input voltage (current I=power P/voltage V), and the input current to power device 106*b* may correspond to total output current Tout.

Figure 4B:
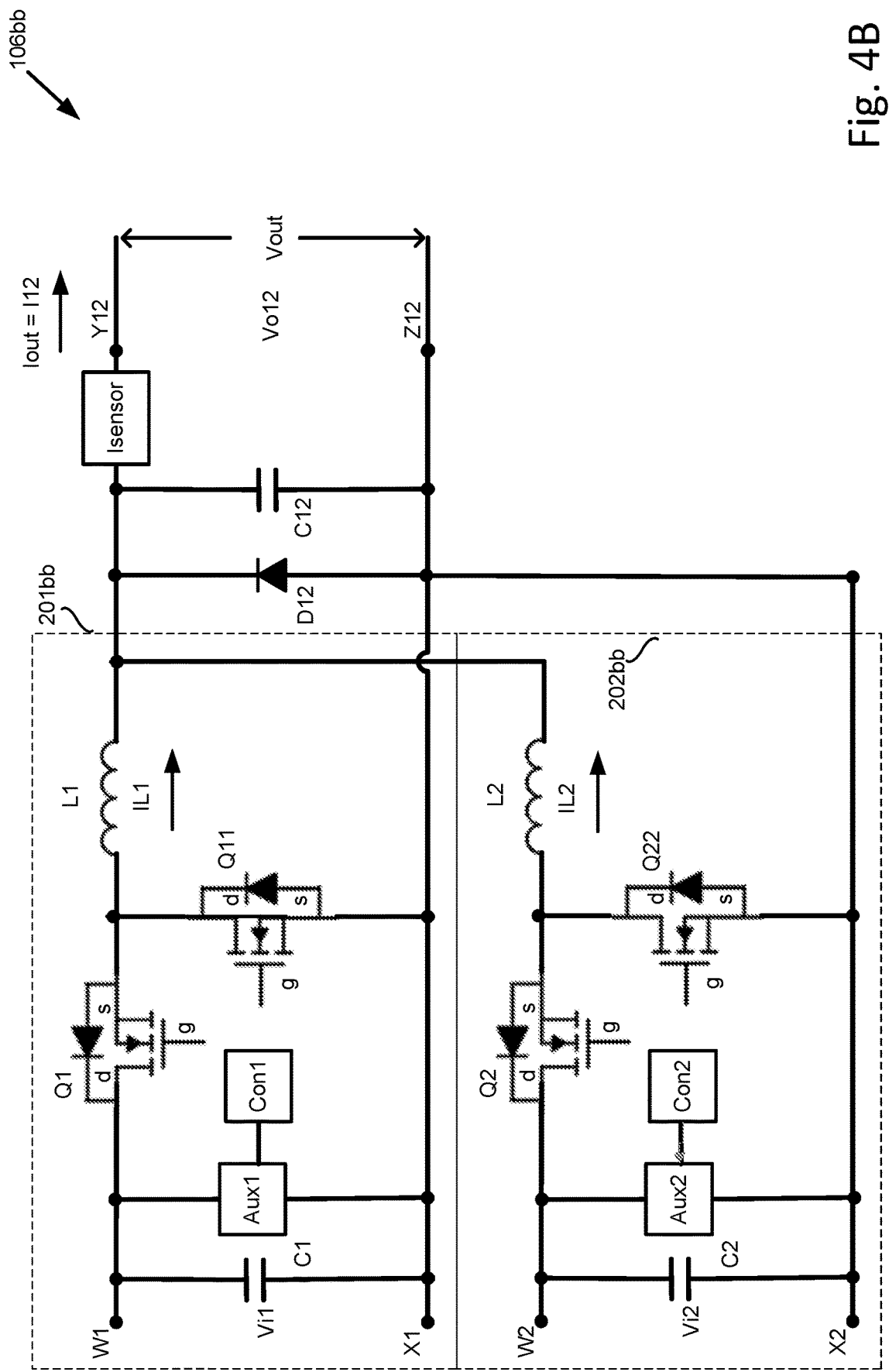
FIG. 4B shows a power device, in accordance with certain examples of the presently disclosed subject matter.

FIG. 4B shows a power device 106*bb* according to examples of the present subject matter. Power device 106*bb* may include a plurality of power stages 201*bb*, 202*bb* connected in parallel at the output of power device 106*bb*. Power device 106*bb* may be similar to other power devices 106 shown herein, except that power device 106*bb* shows that the power device 106 may include a shared current sensor Isensor. The shared current sensor may be arranged between a terminal of one or more of the inductors L1, L2 and an output terminal of the power device 106*bb*, and may be configured to measure the total combined current of the power stages 201*bb*, 202*bb*. If the plurality of power stages 201*bb*, 202*bb* were in separate power devices, then a plurality of current sensors may be used instead of the shared current sensor Isensor.

Figure 4C:
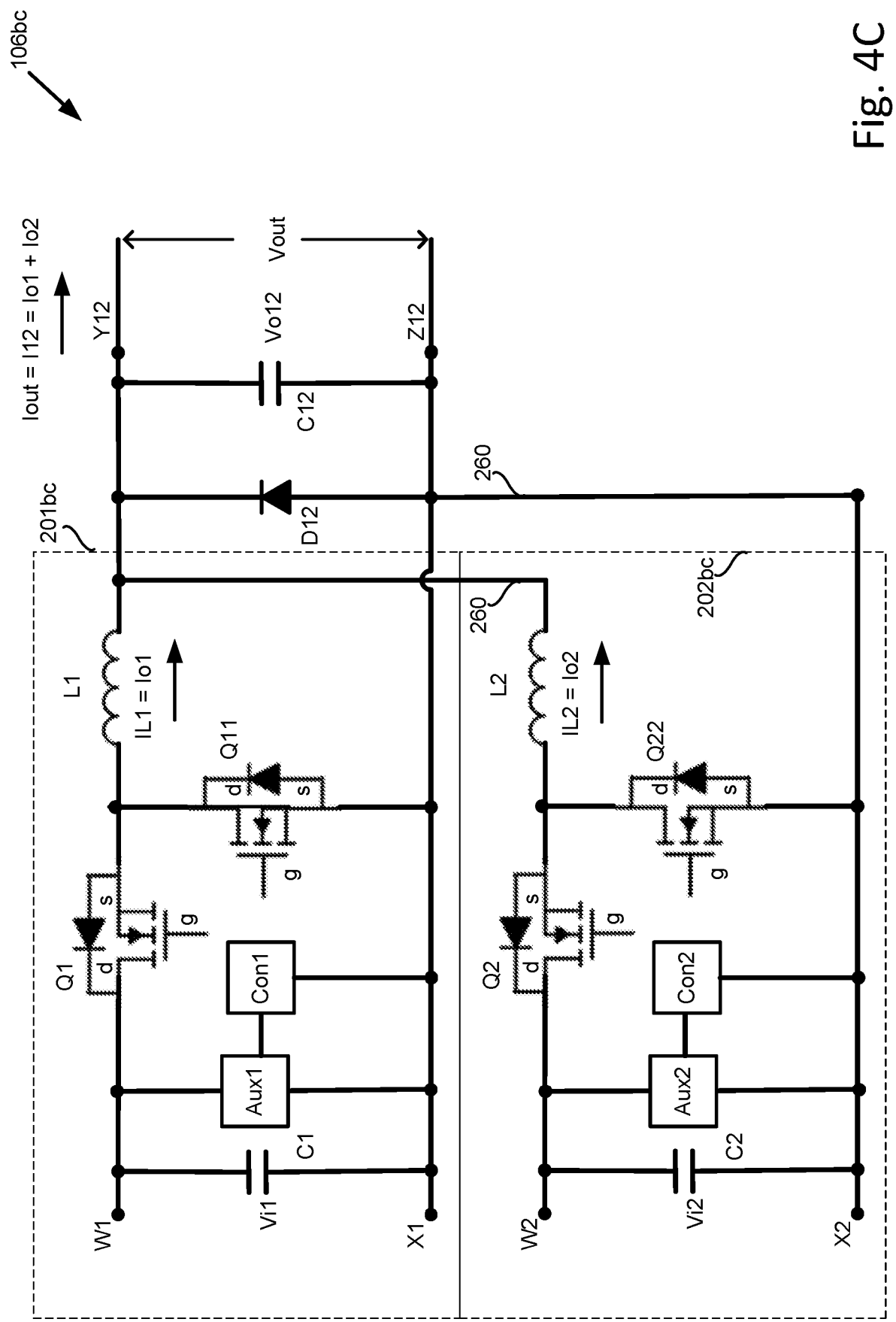
FIG. 4C shows a power device, in accordance with certain examples of the presently disclosed subject matter.

FIG. 4C shows a power device 106*bc* according to examples of the present subject matter. Power device 106*bc* may include a plurality of power stages 201*bc*, 202*bc* connected in parallel at the output of power device 106*bc*. Power device 106*bc* may be similar to other power devices 106 shown herein, except that power device 106*bc* shows that one or more controllers Con1, Con2 of the power device 106 may be connected to the same earth/ground potential, which (e.g., as described above) may provide possible benefits to the power device (e.g., to facilitate communication and/or provide relatively quick communication between the plurality of controllers). A similar connection between a controller and the earth/ground potential is also shown in FIG. 6B.

Figure 4D:
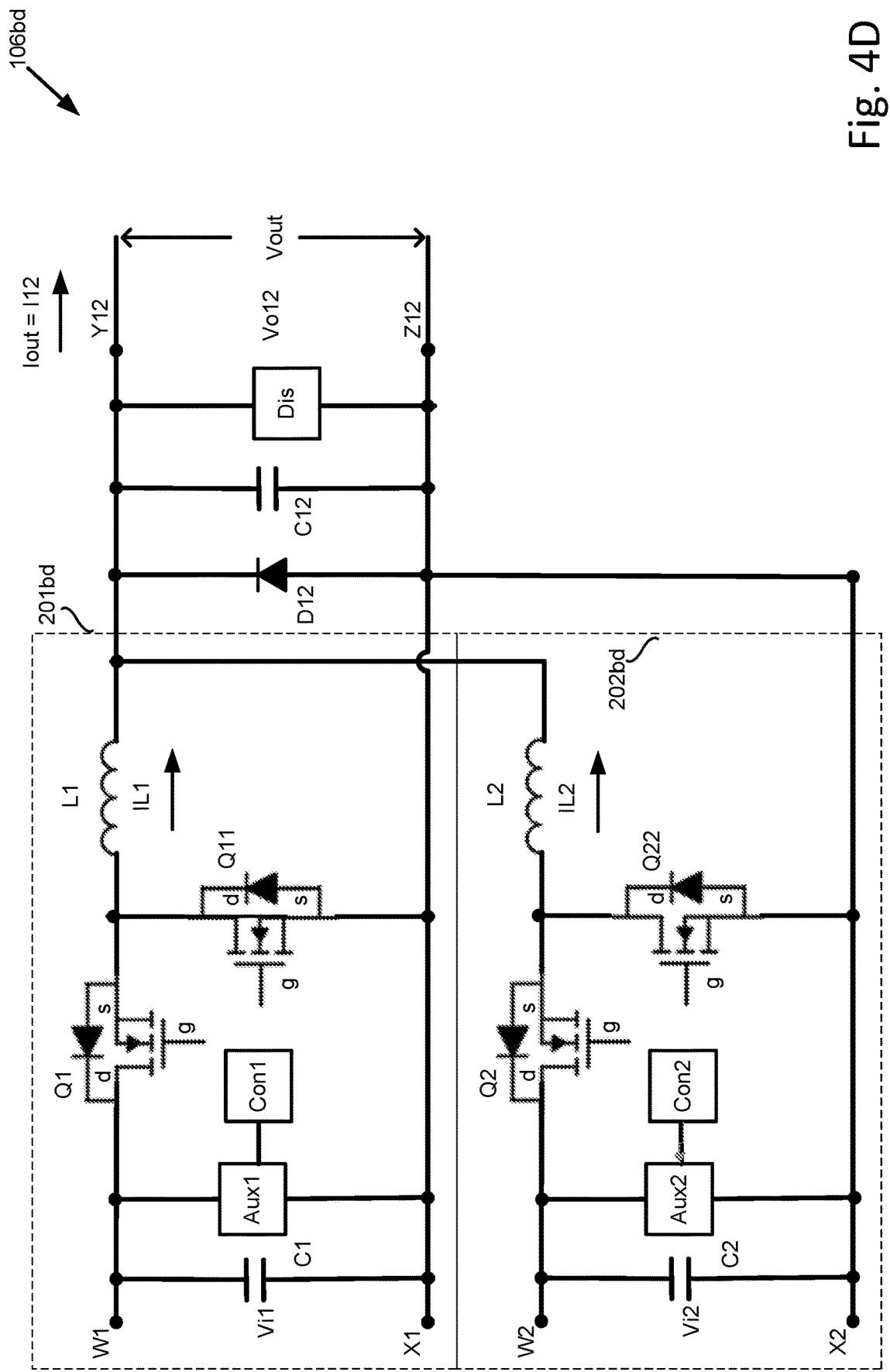
FIG. 4D shows a power device, in accordance with certain examples of the presently disclosed subject matter.

FIG. 4D shows a power device 106*bd* according to examples of the present subject matter. Power device 106*bd* may include a plurality of power stages 201*bd*, 202*bd* connected in parallel at the output of power device 106*bb*. Power device 106*bd* may be similar to other power devices 106 shown herein, except that power device 106*bd* shows that the power device 106 may include a shared discharge circuit Dis. The shared discharge circuit Dis may be arranged across the output terminals of the power device 106*bd*, and may be configured to perform discharge for the power device 106*bd* (e.g., for both power stages 201*bd*, 202*bd* together, for example, discharge circuitry Dis may be controlled by one or more controllers to perform discharge based on/in response to one or more discharge conditions [e.g., a voltage value above a certain threshold, disconnect of one or more switches, etc.] related to one or more power source that the power device is connected to). If the plurality of power stages 201*bd*, 202*bd* were in separate power devices, then a plurality of discharge circuits may be required instead of the shared discharge circuit Dis.

Figure 4E:
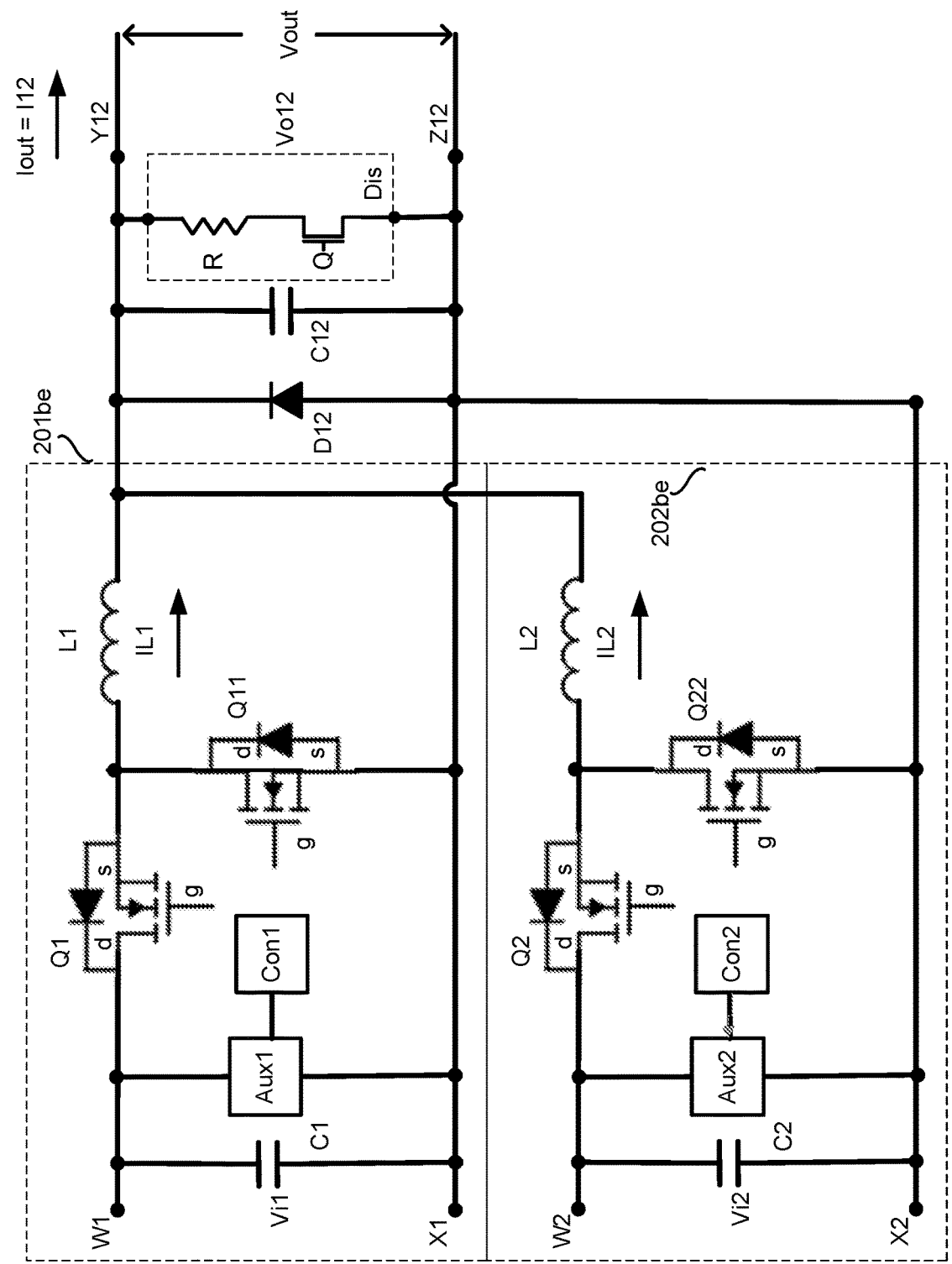
FIG. 4E shows a power device, in accordance with certain examples of the presently disclosed subject matter.

FIG. 4E shows a power device 106*be* according to examples of the present subject matter. Power device 106*be* may include a plurality of power stages 201*be*, 202*be* connected in parallel at the output of power device 106*be*. Similar to power device 106*bd*, power device 106*be* may include a shared discharge circuit Dis. The shared discharge circuit Dis may be arranged across the output terminals of the power device 106*be*, and may be configured to perform discharge for the power device 106*be*. The shared discharge circuit Dis may include a discharge resistor R and discharge switch Q. For example, if one or more discharge conditions are obtained by one or more controllers, then those one or more controllers may active the discharge circuitry (e.g., close the discharge switch Q), which may discharge a voltage by inducing current to flow through the discharge resistor R.

Similar to what was shown with the shared bypass diode, the power devices 106 may have other shared elements (or additional elements) as described above (e.g., the shared elements may include a shared: capacitor, inductor, controller, auxiliary power unit, sensor, PLC, RSD, etc.). As an example, one or more shared sensor (e.g. shared current sensor) may be connected at an input of the power device and/or power stages, and the shared sensor may be configured to measure/obtain data related to the plurality of power stages (e.g., sense/measure a differential [input] current between the plurality of power stages).

As also described above, the power device may include a plurality of respective elements (e.g., controllers, auxiliary power units, bypass diodes, etc.) and/or additional elements that may be configured to provide additional functionalities (e.g., that may be configured to help obtain data that may be used to build graphs related to the operation/performance of elements of the power system [e.g., power sources, power devices, switches/diodes, etc.]).

Figure 5:
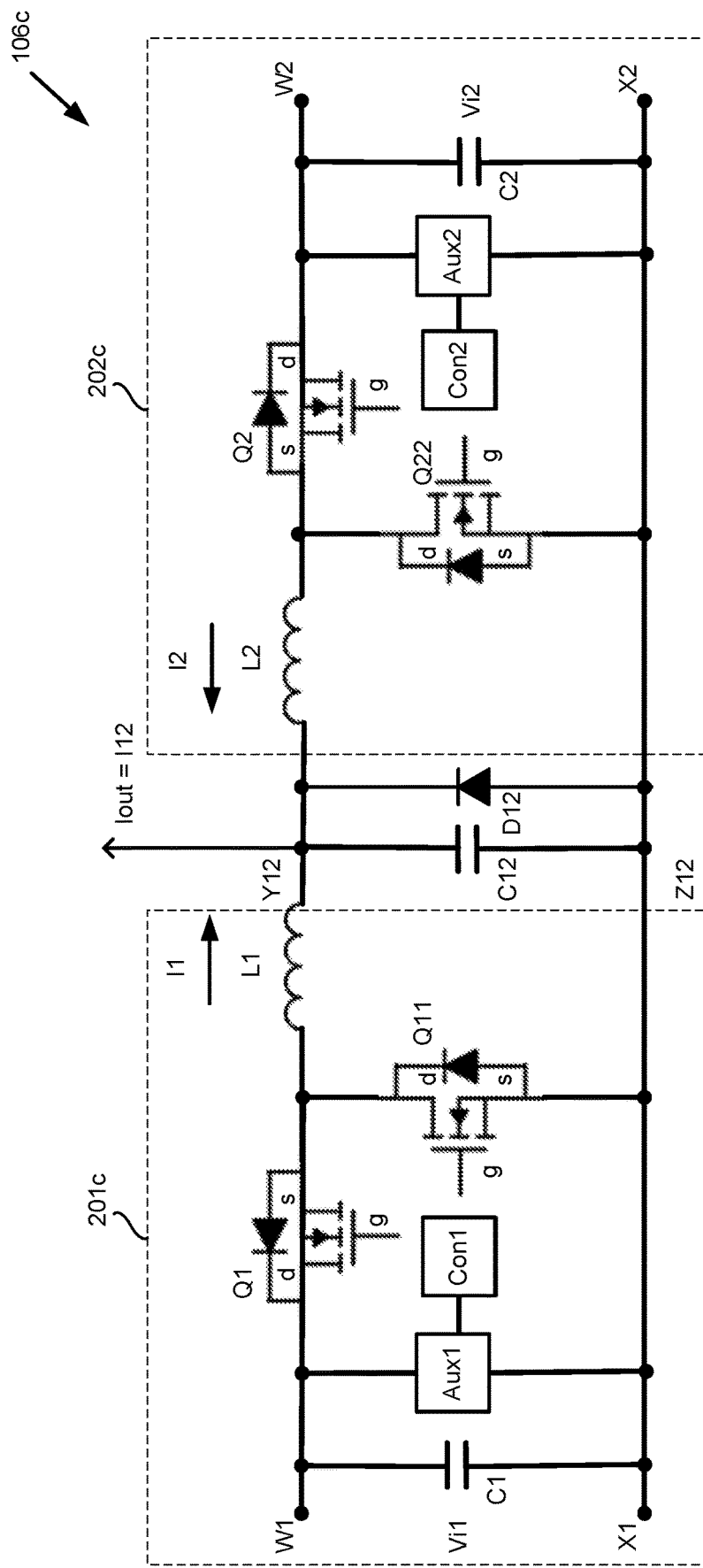
FIG. 5 shows a power device, in accordance with certain examples of the presently disclosed subject matter.

FIG. 5 shows a power device 106*c* according to examples of the present subject matter. Power device 106*c* may include power stages 201*c*, 202*c* that are connected in a parallel connection. Power device 106*c* may be similar to other power devices 106 shown herein, except that power device 106*c* shows the power stages 201, 202 shown side-by-side in FIG. 5.

Similar to other power devices 106 shown herein (for example, power device 106*b*), the power stages 201*c*, 202*c* of power device 106*c* have a shared earth/ground potential. The earth/ground potential may be a virtual/local earth/ground potential (as opposed to being electrically connected to the actual earth/ground). For example, the earth/ground potential may be related to a voltage (e.g., a floating voltage) relative to the actual earth/ground potential.

The shared earth/ground potential may help the power device 106 to have shared elements (e.g., fewer elements than if the power device did not have a plurality of power stages). This may have the advantage of facilitating communication between a plurality of controllers (e.g., by providing them with the same reference voltage, or by using a single controller instead of a plurality of controllers since the single controller may be connected to a plurality of respective auxiliary power units and/or respective power source[s] via the shared earth/ground potential). The shared earth/ground potential may also help the power device 106 to be configured with additional functionalities (e.g., when there are elements, such as controllers and/or auxiliary power units, for each of the plurality of power stages). For example, (e.g., to allow the power device to obtain lesser voltage data and/or perform a current-voltage operating point search at relatively lesser voltages and/or peak sweep/ peak search at relatively lesser voltages) since one element may be able to perform functions normally performed by another element, this may free up the other element to perform other functions that might not be possible in a case where the power device only has a single element and may not be free to perform such functions or may not be able to perform functions in certain voltage ranges.

FIG. 6A shows a power device 106d according to examples of the present subject matter. Power device 106d may include power stages 201d, 202d that are connected in a parallel-output connection. Power device 106d may be similar to other power devices 106 shown herein, except that power device 106d shows that the power device 106 may include a single shared auxiliary power unit Aux and a single shared controller Con (e.g., shared by power stages 201d, 202d). The single shared auxiliary power unit Aux and/or the single shared controller Con may be connected to each of the plurality of power stages 201d, 202d through the shared earth/ground potential. The single shared auxiliary power unit Aux and/or the single shared controller Con may be connected to each of the plurality of power stages 201d, 202d through one or more other shared terminals. For example, the single shared auxiliary power unit Aux may be connected to terminal W1, and terminal W1 may be connected to terminal W2 (not shown) thereby providing a shared terminal W12 (not shown). Terminal W1 may be connected to terminal W2 via one or more electrical element (e.g., one or more diode [not shown]). The single shared auxiliary power unit Aux and/or the single shared controller Con may be configured to operate for the plurality of power stages 201d, 202d.

FIG. 6B shows a power device 106db according to examples of the present subject matter. Power system device 106db may include a plurality of power stages 201db, 202db connected in parallel at the output of power device 106db. Power device 106db may also have a single shared auxiliary power unit Aux and a single shared controller Con (e.g., shared by power stages 201db, 202db). The single shared auxiliary power unit Aux and/or the single shared controller Con may be connected to each of the plurality of power stages 201db, 202db through the shared earth/ground potential. Power device 106db may be similar to other power devices 106 shown herein, except that power device 106db shows that the single shared auxiliary power unit Aux and/or the single shared controller Con may also be connected to each of the plurality of power stages 201db, 202db through one or more electrical elements. For example, the single shared auxiliary power unit Aux may be connected to power stage 201db via a diode D11 connected between terminal W1 and the auxiliary power unit Aux. The single shared auxiliary power unit Aux may also be connected to power stage 202db via a diode D22 connected between terminal W2 and the auxiliary power unit Aux. The single shared controller Con may be connected to the plurality of power stages 201d, 202d via the single shared auxiliary power unit Aux (e.g., the single shared controller Con may be directly connected to the single shared auxiliary power unit Aux). The single shared controller Con may be connected to the shared earth/ground potential to provide a path for the current to return to the respective power source/power stage. For example, if a current/signal is provided by the first power source/power stage 201db (e.g., represented by voltage Vpv1) it may flow through the first diode D11 to the controller Con (e.g., via auxiliary power unit Aux) and a current/signal may return to the first power source/power stage 201db via the shared earth/ground potential. If a different current/signal is provided by the second power source/power stage 202db (e.g., represented by voltage Vpv2) it may flow through the second diode D22 to the controller Con (e.g., via auxiliary power unit Aux) and a current/signal may return to the second power source/power stage 202db via the shared earth/ground potential.

For example, power may be provided to one or more of the plurality of power stages 201, 202 (e.g., one or more of the controllers) from a power source (e.g., one or more of the respective power sources connected to one or more of the respective power stages 201, 202). This power may be provided to one or more elements of the power device (e.g., one or more elements of the respective power stage 201, 202 directly connected to that respective power source, and/or one or more elements of another respective power stage 201, 202 directly connected to another respective power source, for example, to one or more controllers, one or more auxiliary units, one or more PLC units, etc.).

For example, power may be provided to a first power stage 201 (e.g., to a first controller Con1 or shared controller Con, and/or to a first auxiliary unit Aux1 or shared auxiliary unit Aux) from a first power source 102 (or auxiliary power unit). Power may also be provided to a second power stage 202 (e.g., to a second controller Con2 or the shared controller Con, and/or to a second auxiliary unit Aux2 or the shared auxiliary unit Aux) from the same first power source 102 (or auxiliary power unit) (e.g., when the other second power source 104 is not producing power, or the power from the second power source 104 or other auxiliary unit is being used for a different function, for example to perform a current-voltage operating point search and/or a peak sweep/ peak search).

As an example, a first voltage may be provided to first power stage 201db (e.g., to shared controller Con via shared auxiliary unit Aux) from a first power source 102, represented as Vi1 in FIG. 6B. This may allow the shared controller to monitor the first power source 102 and/or a second power source 104, even though power source 104 is not producing power (e.g., Vi1 is greater than about 12V and Vi2 is less than about 12 V or about 0 V).

As another example, a first voltage may be provided to first power stage 201db (e.g., to shared controller Con via shared auxiliary unit Aux) from a first power source 102, represented as Vi1 in FIG. 6B. A second voltage may be provided to second power stage 202db (e.g., to shared controller Con via shared auxiliary unit Aux) from a second power source 104, represented as Vi2 in FIG. 6B (e.g., Vi1 is greater than about 12V and Vi2 is also greater than about 12 V). This may allow the shared controller to perform a current-voltage operating point search and/or a peak sweep/ peak search (e.g., even at relatively lesser voltages) on the first power source 102 and/or the second power source 104 (since the controller and/or auxiliary is receiving sufficient power from the first source, it can utilize excess power or power from a different source in order to perform the additional functions, e.g., a search even below 12 V). For example, the first power source 102 may provide 60 V including 12 V to the shared auxiliary unit Aux. Normally (e.g., in a case where there is not a plurality of power stages in the power device), since that 12 V is being provided to auxiliary unit 12 V, then a search may be performed at a voltage greater than 12 V. However, in a case where there is a plurality of power stages 201, 202 in the power device 106, the first power source 102 may provide power to the auxiliary unit Aux and a second power source (e.g., second power source 104 or second auxiliary power unit Aux2) may provide power to the controller Con to perform a search even at voltages less than 12 V. A similar case may be true for obtaining data and monitoring one or more power source at voltages even less than 12 V, where since power may be provided to one or more controller/auxiliary unit from a first power source (e.g., the first power source 102), and power may also be provided to one or more controller from a second power source (e.g., the second power source 104 or a different auxiliary power unit), then one or more controller may be able to obtain data related to relatively lesser voltages, e.g., less than about 12 V, for one or more of the respective power sources 102, 104.

FIG. 7 to FIG. 14 show examples of power devices 106 connected to a plurality of power sources 102, 104 according to examples of the present subject matter. The power devices 106 shown in FIG. 7 to FIG. 14 may be part of the various power systems 100 shown in FIG. 1A to FIG. 2B. FIG. 7 to FIG. 10 show examples of power devices 106 with series-connected power stages 201, 202 according to examples of the present subject matter. For example, the power devices 106 with series-connected power stages 201, 202 shown in FIG. 7 to FIG. 10 may be any of the various power devices 106 with series-connected power stages 201, 202 shown in FIG. 3A to FIG. 3H.

Figure 7:
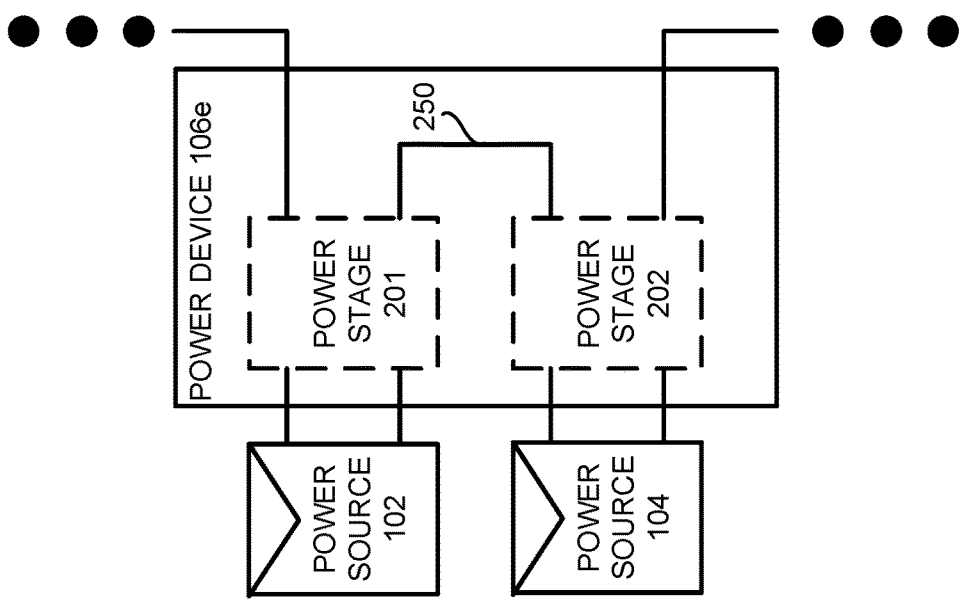
FIG. 7 shows a power device, in accordance with certain examples of the presently disclosed subject matter.

FIG. 7 shows a power device 106e according to examples of the present subject matter. Power device 106e may include a plurality of power stages 201, 202 having outputs connected in series through a connection 250.

In FIG. 7, each power stage 201, 202 is shown as having inputs connected to one respective power source 102, 104. The respective power sources 102, 104 may be connected in parallel to power device 106e (e.g., to the input of power device 106e).

As mentioned above, any of the power devices 106 (e.g., power devices 106e-106l shown in FIGS. 7-14) may be connected to one or more other power devices 106 (e.g., in parallel and/or series). One or more power devices 106/ strings 114 of power devices 106 may be connected to one or more system power devices 110 (e.g., in parallel and/or series).

In some examples, one power stage 201, 202 may be connected to a single power source and another power stage 201, 202 may be connected to a plurality of power sources.

In some examples, each power stage 201, 202 may be connected to a respective plurality of power sources (as shown in FIGS. 8-10, and FIGS. 12-14).

Figure 8:
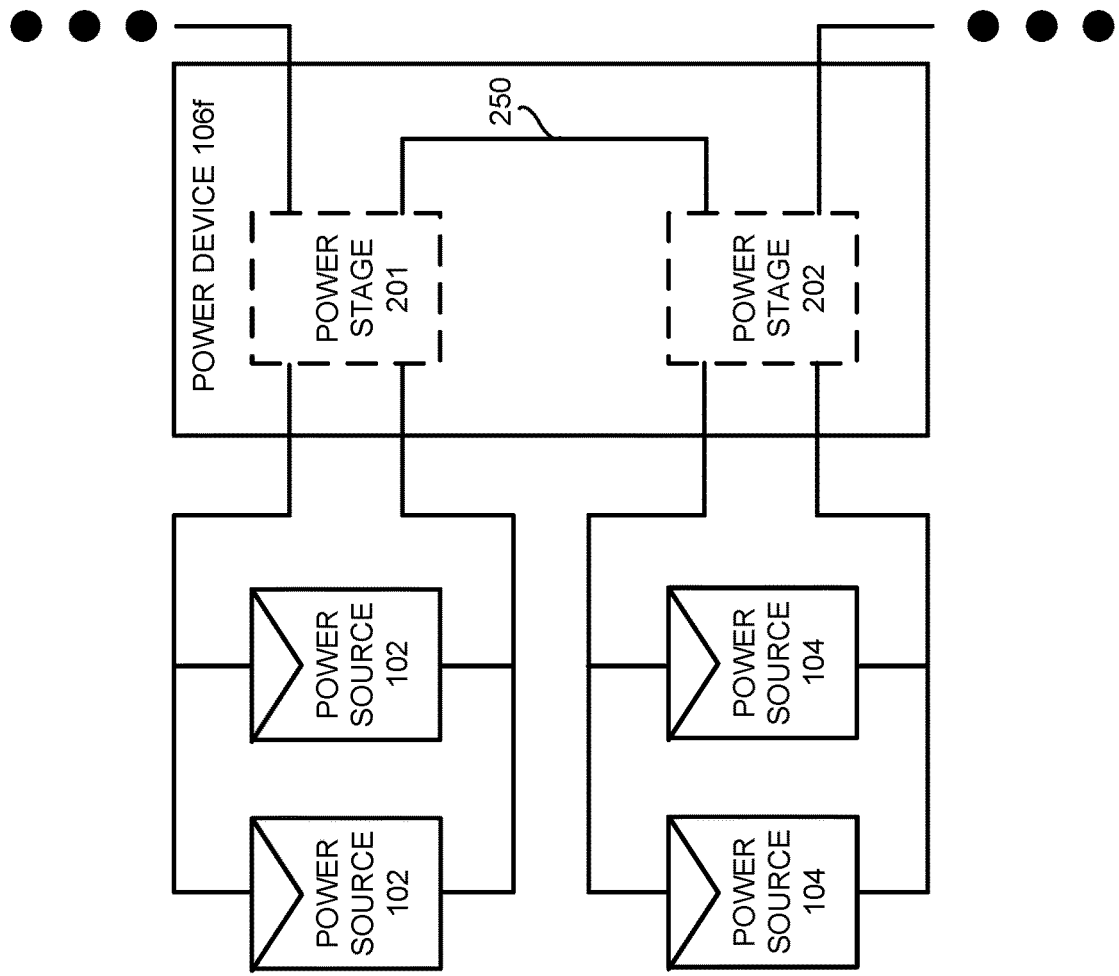
FIG. 8 shows a power device, in accordance with certain examples of the presently disclosed subject matter.

FIG. 8 shows a power device 106f according to examples of the present subject matter. Power device 106f may include a plurality of power stages 201, 202 having outputs connected in series through a connection 250.

In FIG. 8, each power stage 201, 202 is shown as having inputs connected to a respective plurality of respective power sources 102, 104. The respective plurality of power sources 102, 104 may be connected in parallel to each other. Each respective plurality of power sources 102, 104 may also include a plurality of power sources 102 connected in parallel to a first input of power device 106f (e.g., to a first power stage 201), and a plurality of power sources 104 connected in parallel to a second input of power device 106f (e.g., to a second power stage 202).

Figure 9:
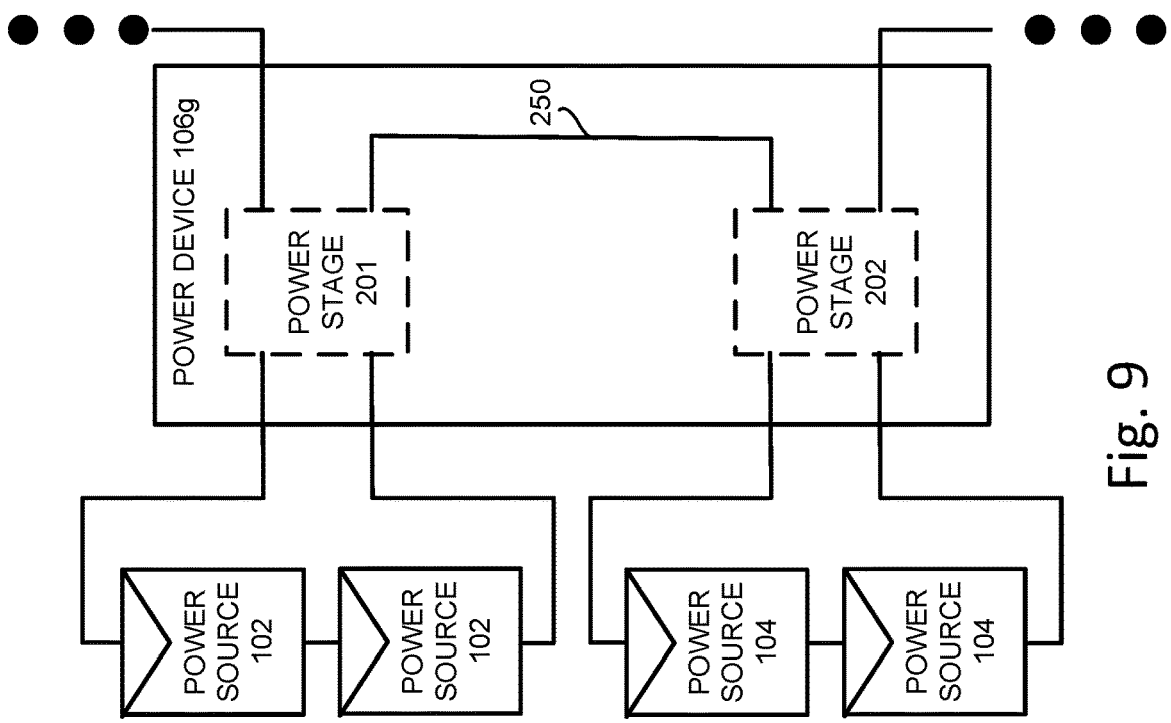
FIG. 9 shows a power device, in accordance with certain examples of the presently disclosed subject matter.

FIG. 9 shows a power device 106g according to examples of the present subject matter. Power device 106g may include a plurality of power stages 201, 202 having outputs connected in series through a connection 250.

In FIG. 9, each power stage 201, 202 is shown as having inputs connected to a respective plurality of respective power sources 102, 104. The respective plurality of power sources 102, 104 may be connected in parallel to each other. Each respective plurality of power sources 102, 104 may also include a plurality of power sources 102 connected in series to a first input of power device 106g (e.g., to a first power stage 201), and a plurality of power sources 104 connected in series to a second input of power device 106g (e.g., to a second power stage 202).

Figure 10:
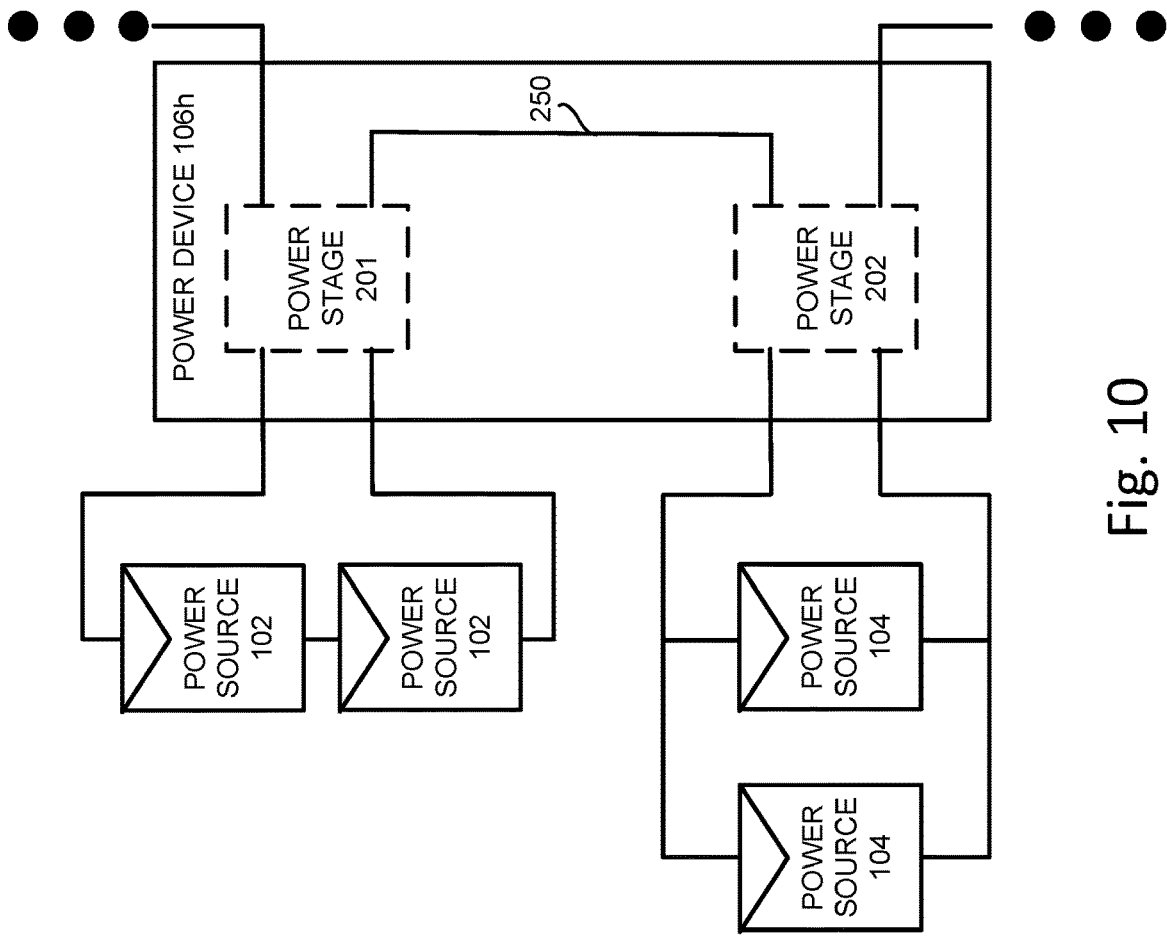
FIG. 10 shows a power device, in accordance with certain examples of the presently disclosed subject matter.

FIG. 10 shows a power device 106h according to examples of the present subject matter. Power device 106h may include a plurality of power stages 201, 202 having outputs connected in series through a connection 250.

In FIG. 10, each power stage 201, 202 is shown as having inputs connected to a respective plurality of respective power sources 102, 104. The respective plurality of power sources 102, 104 may be connected in parallel to each other. Each respective plurality of power sources 102, 104 may also include a plurality of power sources 102 connected in series to a first input of power device 106h (e.g., to a first power stage 201), and may include a plurality of power sources 104 connected in parallel to a second input of power device 106h (e.g., to a second power stage 202).

FIG. 11 to FIG. 14 show examples of power devices 106 with parallel-connected power stages 201, 202 according to examples of the present subject matter. For example, the power devices 106 with parallel-connected power stages 201, 202 shown in FIG. 11 to FIG. 14 may be any of the various power devices 106 with parallel-connected power stages 201, 202 shown in FIG. 4A to FIG. 6B.

Figure 11:
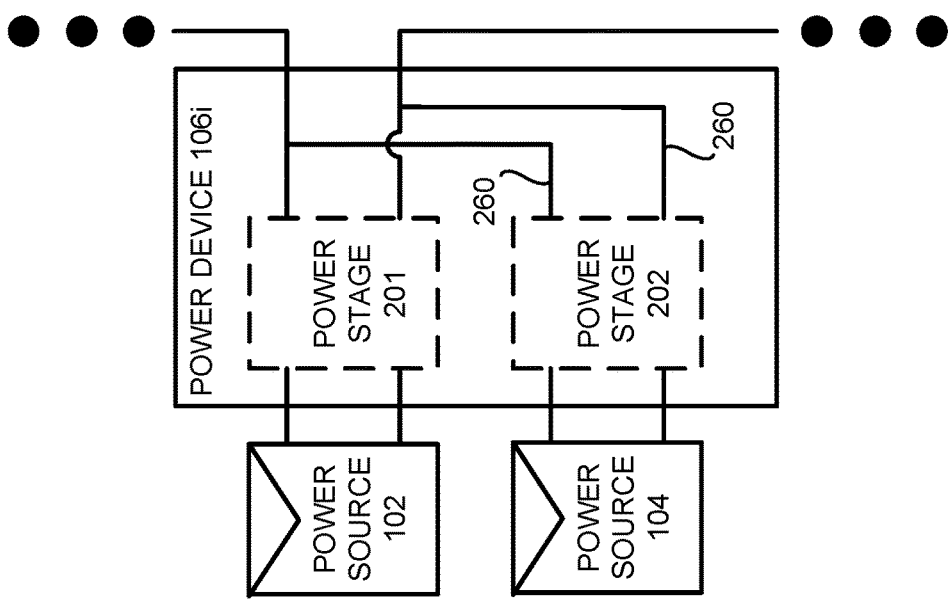
FIG. 11 shows a power device, in accordance with certain examples of the presently disclosed subject matter.

FIG. 11 shows a power device 106i according to examples of the present subject matter. Power device 106i may include a plurality of power stages 201, 202 having outputs connected in parallel (e.g., through a pair of connections 260).

In FIG. 11, each power stage 201, 202 is shown as having inputs connected to one respective power source 102, 104. The respective power sources 102, 104 may be connected in parallel to power device 106i (e.g., to the input of power device 106i).

Figure 12:
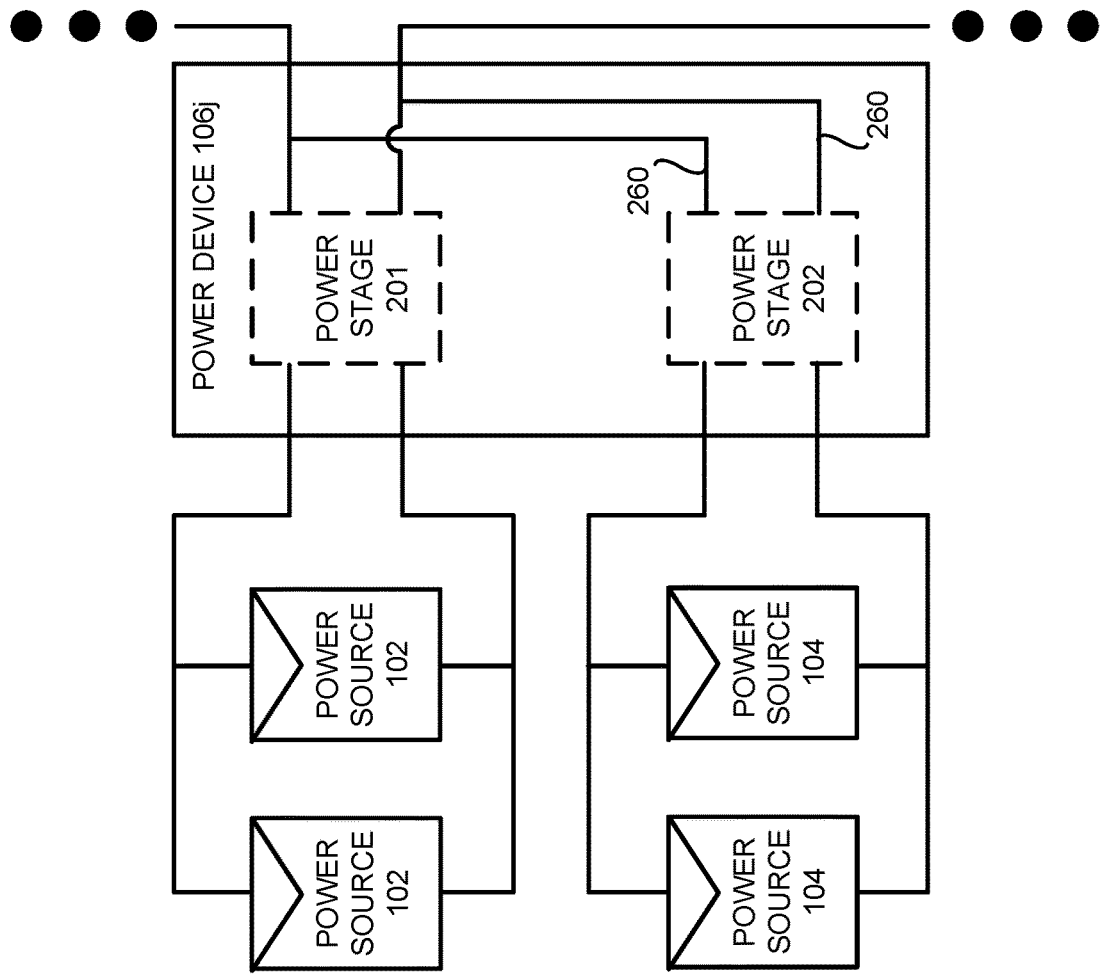
FIG. 12 shows a power device, in accordance with certain examples of the presently disclosed subject matter.

FIG. 12 shows a power device 106j according to examples of the present subject matter. Power device 106j may include a plurality of power stages 201, 202 having outputs connected in parallel (e.g., through a pair of connections 260).

In FIG. 12, each power stage 201, 202 is shown as having inputs connected to a respective plurality of respective power sources 102, 104. The respective plurality of power sources 102, 104 may be connected in parallel to each other. Each respective plurality of power sources 102, 104 may also include a plurality of power sources 102 connected in parallel to a first input of power device 106j (e.g., to a first power stage 201), and a plurality of power sources 104 connected in parallel to a second input of power device 106j (e.g., to a second power stage 202).

Figure 13:
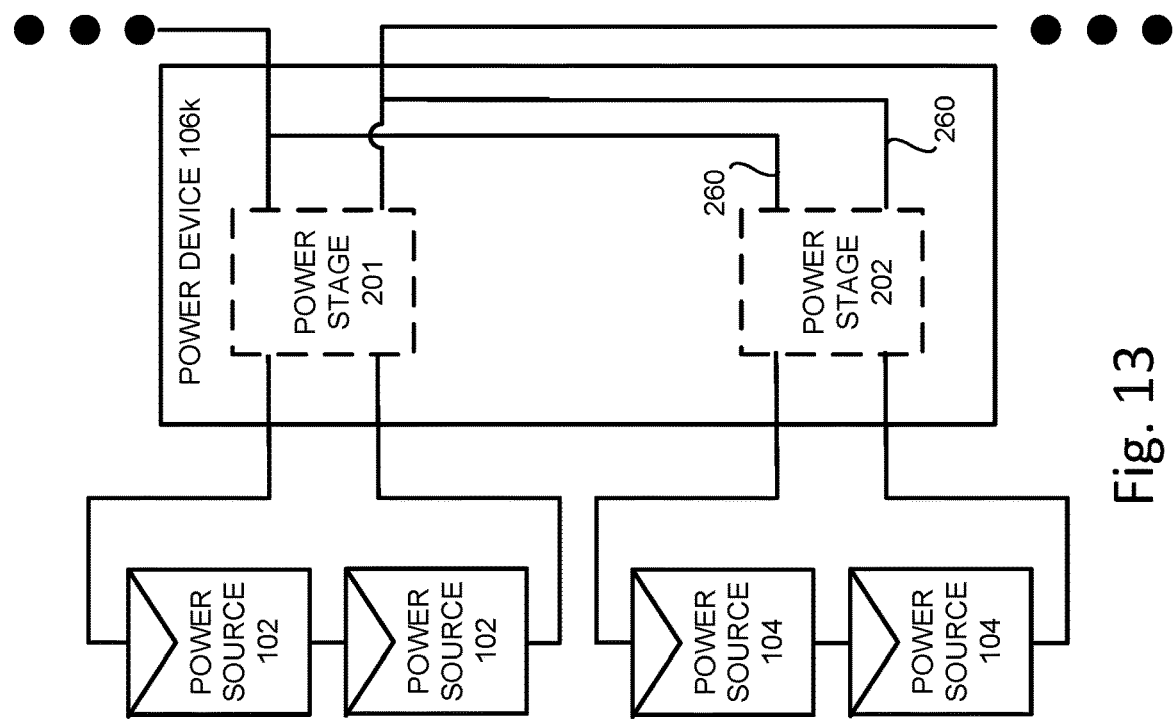
FIG. 13 shows a power device, in accordance with certain examples of the presently disclosed subject matter.

FIG. 13 shows a power device 106k according to examples of the present subject matter. Power device 106k may include a plurality of power stages 201, 202 having outputs connected in parallel (e.g., through a pair of connections 260).

In FIG. 13, each power stage 201, 202 is shown as having inputs connected to a respective plurality of respective power sources 102, 104. The respective plurality of power sources 102, 104 may be connected in parallel to each other. Each respective plurality of power sources 102, 104 may also include a plurality of power sources 102 connected in series to a first input of power device 106k (e.g., to a first power stage 201), and a plurality of power sources 104 connected in series to a second input of power device 106*k* (e.g., to a second power stage 202).

Figure 14:
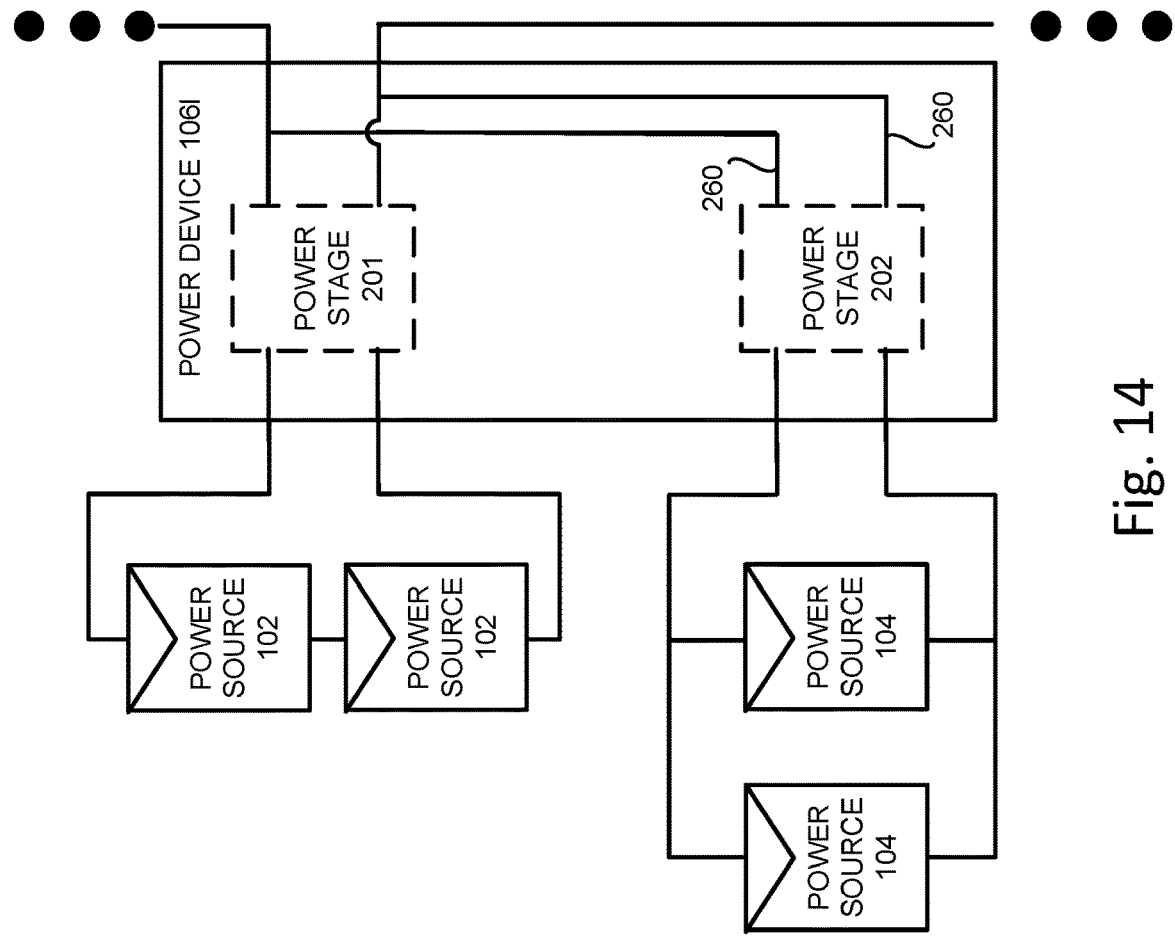
FIG. 14 shows a power device, in accordance with certain examples of the presently disclosed subject matter.

FIG. 14 shows a power device 106*l* according to examples of the present subject matter. Power device 106*l* may include a plurality of power stages 201, 202 having outputs connected in parallel (e.g., through a pair of connections 260).

In FIG. 14, each power stage 201, 202 is shown as having inputs connected to a respective plurality of respective power sources 102, 104. The respective plurality of power sources 102, 104 may be connected in parallel to each other. Each respective plurality of power sources 102, 104 may also include a plurality of power sources 102 connected in series to a first input of power device 106*l* (e.g., to a first power stage 201), and a plurality of power sources 104 connected in parallel to a second input of power device 106*l* (e.g., to a second power stage 202).

FIG. 15 to FIG. 19 show examples of graphs and flow charts. For example, the graphs and flow charts may be related to the various power systems 100 and power devices 106 shown in FIG. 1A to FIG. 14.

Figure 15A:
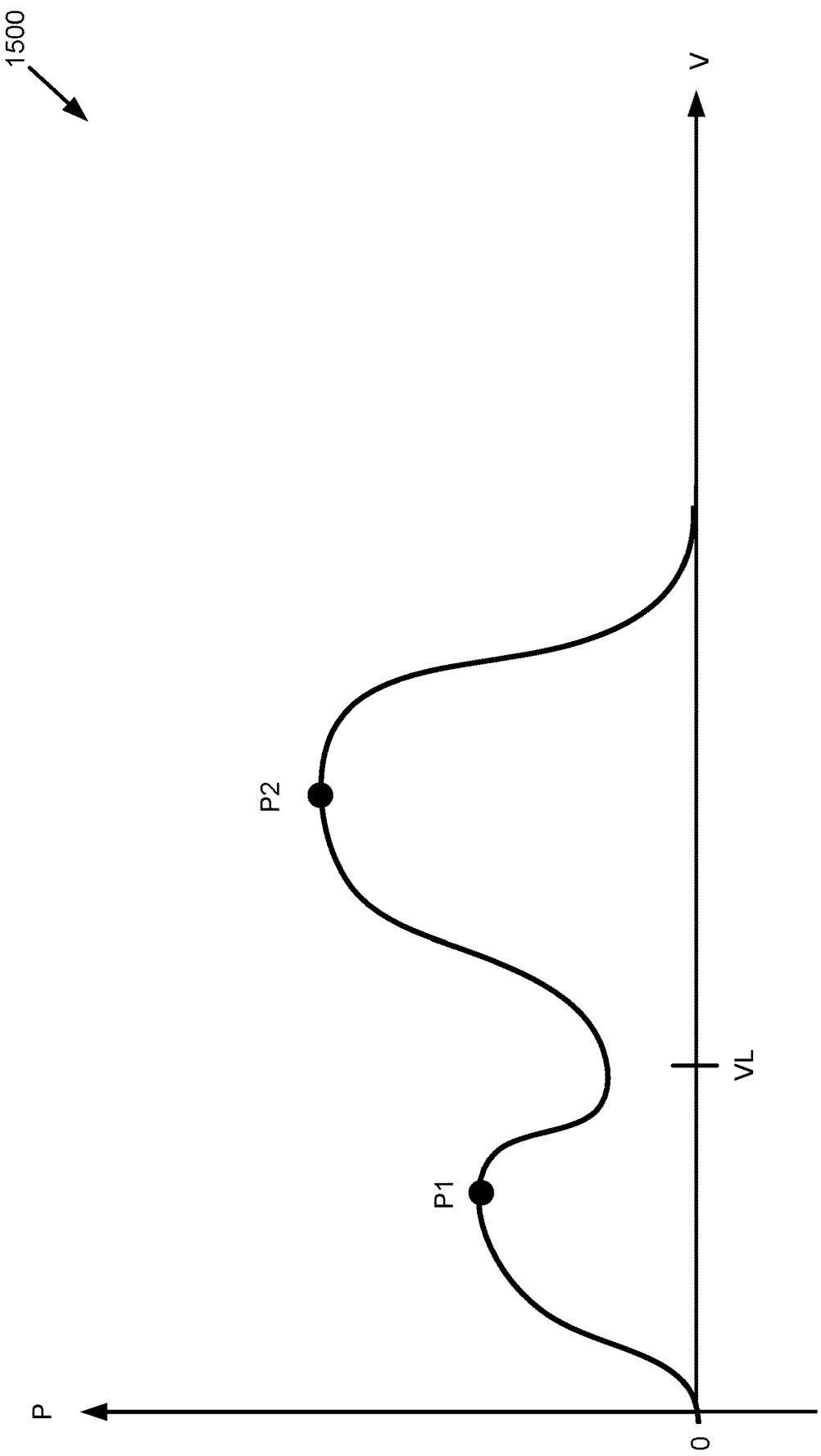
FIG. 15A shows a graph, in accordance with certain examples of the presently disclosed subject matter.

FIG. 15A and FIG. 15B illustrate graphs according to examples of the present subject matter. As mentioned above, power device 106 may be configured to determine a peak operating power using a peak sweep/peak search even at relatively lesser voltage values. In the example shown in graph 1500 of FIG. 15A, if a peak sweep/peak search was performed to find the highest peak then it might not matter if the sweep was performed from below a relatively lesser threshold voltage of about voltage VL (e.g., about 12 V or about 5 V) since the first peak P1 shown in graph 1500 is lesser than the second peak P2 in graph 1500 (i.e., peak P2 is greater than peak P1). However, in the case shown in graph 1502 of FIG. 15B, if the first peak P1 is greater than the second peak P2, and the peak sweep/peak search was performed only at voltages greater than the relatively lesser threshold voltage of about voltage VL, then the peak sweep/peak search might only find the lesser second peak P2 and not the greater first peak P1. In such a case if the lesser second peak P2 was selected, then the power device/power system may be missing out on a potentially greater output power. On the other hand, if in this example the peak sweep/peak search was performed also at voltages less than the relatively lesser threshold voltage of about voltage VL, then the peak sweep/peak search might also find the greater first peak P1. In such a case the greater first peak P1 may be selected, and the power device/power system may benefit from a potentially greater output power.

Performing a peak sweep/peak search at a relatively lesser voltage may help with degradation detection and analysis (e.g., in examples where there is a relatively lesser power source, burnt/damaged switches/diodes in the power source, substring optimization, etc.).

Figure 16:
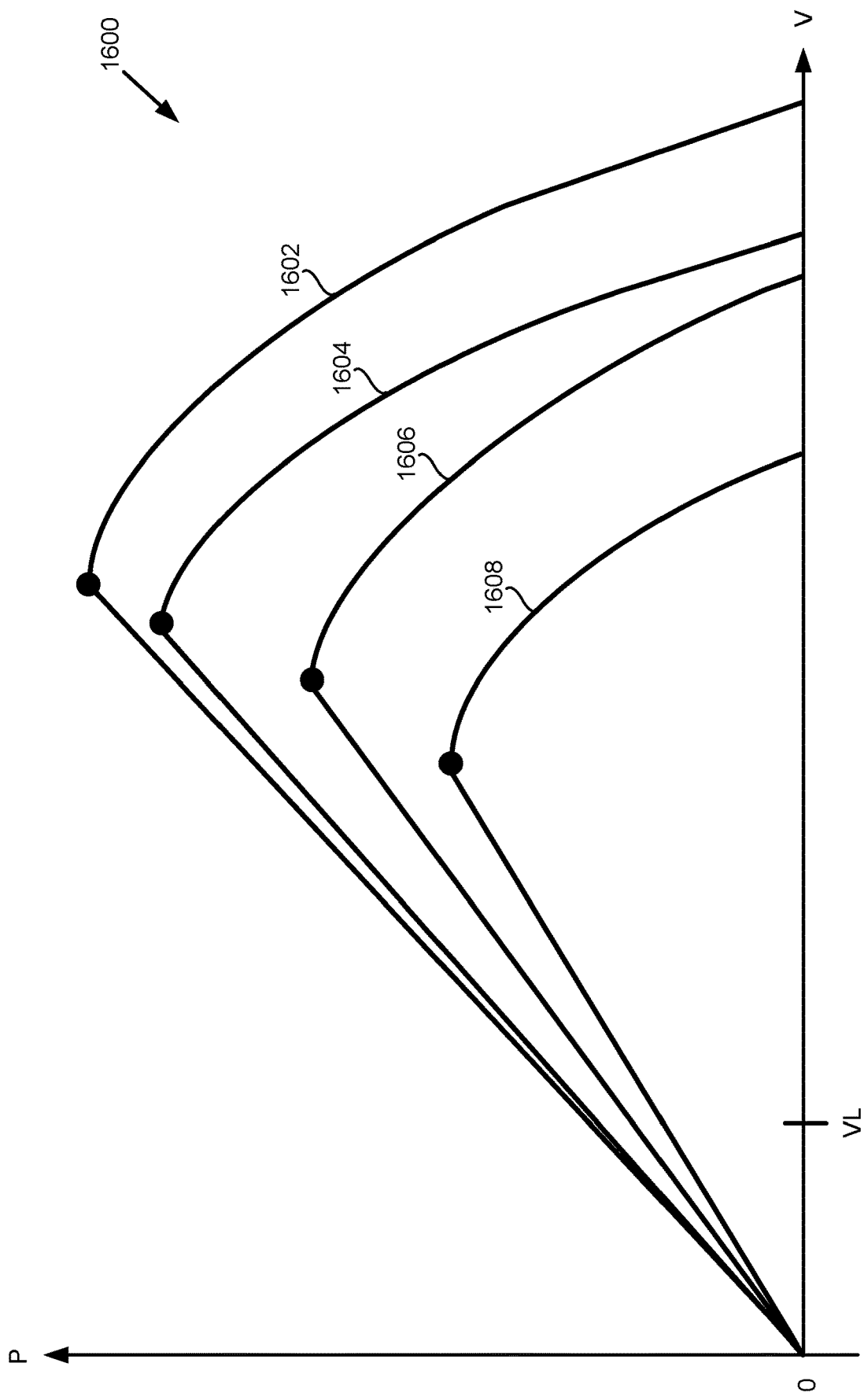
FIG. 16 shows a graph, in accordance with certain examples of the presently disclosed subject matter.

FIG. 16 shows a graph according to examples of the present subject matter. Power device 106 may be configured to obtain data related to a relatively lesser voltage. For example, other power devices might not be able to obtain data (e.g., power and/or performance data) related to a relatively lesser voltage (e.g., less than a threshold, for example, less than about 12 V, less than about 5 V, about 0 V, and/or less than about 0 V). This data may be used to determine data related to the longevity of elements of the power system (e.g., power devices, power sources, etc.). Each curve 1602, 1604, 1606, 1608 may relate to a different time period (e.g., years, months, days, etc.) for one or more elements of the power system (e.g. one or more power devices). For example, curve 1602 may relate to power produced by a power source during the course of a first year, curve 1604 may relate to power produced by a power source during the course of a second year, curve 1606 may relate to power produced by a power source during the course of a third year, curve 1608 may relate to power produced by a power source during the course of a fourth year, etc. In the present subject matter, since data may be obtained even at relatively low voltages (e.g., between about 0 V-VL, e.g., between about 0 V-about 12 V, or about 0 V-about 5 V, or even less than 0 volts), then additional conclusions may be determined related to that data than would be otherwise possible if that data was unavailable. As another example, curve 1602 may relate to power produced by a power source during the course of a first hour of the day, curve 1604 may relate to power produced by a power source during the course of a second hour of the day, curve 1606 may relate to power produced by a power source during the course of a third hour of the day, curve 1608 may relate to power produced by a power source during the course of a fourth hour of the day, etc. As an additional example, curve 1602 may relate to power produced by a first power source during the course of a year, curve 1604 may relate to power produced by a second power source during the course of the year, curve 1606 may relate to power produced by a third power source during the course of the year, curve 1608 may relate to power produced by a fourth power source during the course of the year, etc.

Figure 17:
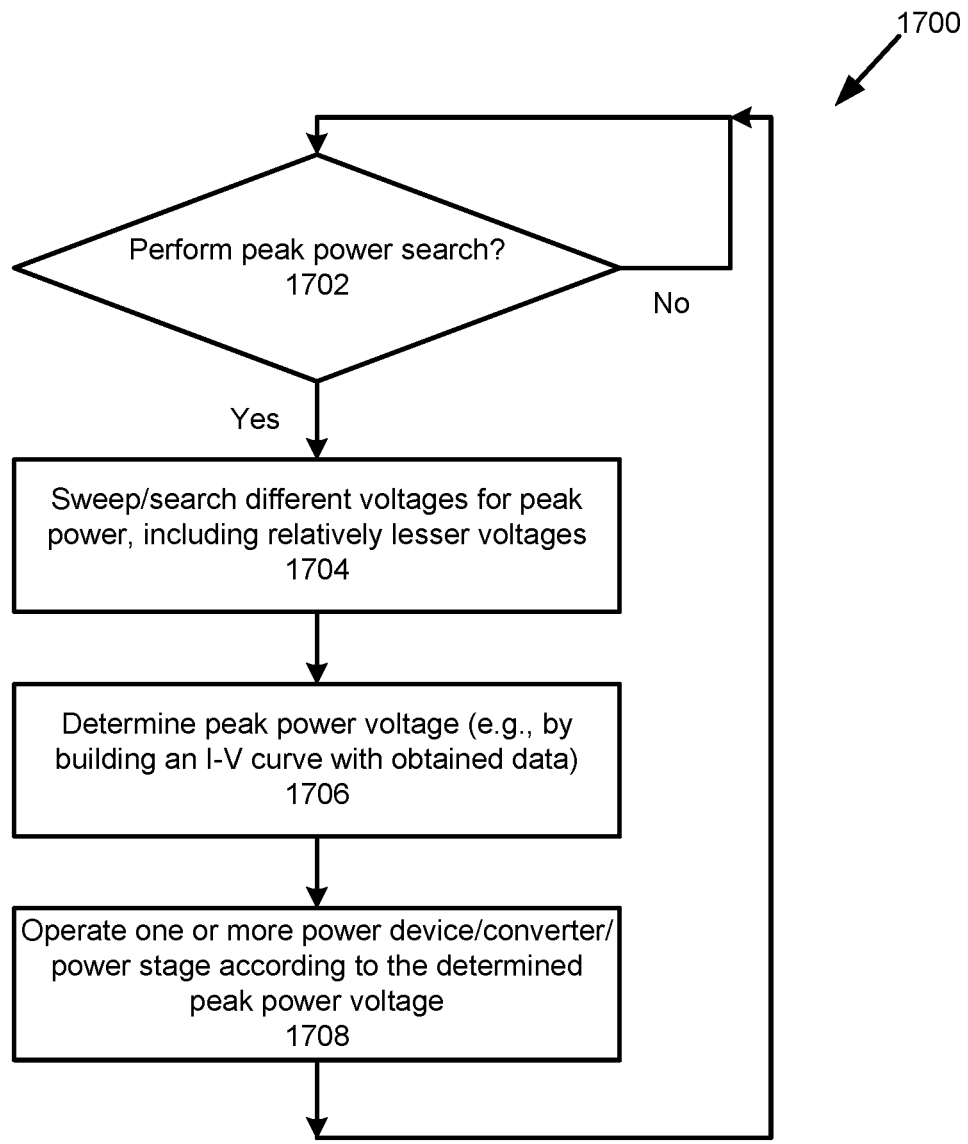
FIG. 17 shows a flow chart of a method, in accordance with certain examples of the presently disclosed subject matter.

FIG. 17 shows a flow chart/process 1700 of a method according to examples of the present subject matter. The shown example relates to a peak power search, but similar operations may be performed for other current-voltage operating point searches (e.g., using a power device having a plurality of auxiliary power units).

In step 1702 a decision is made whether to perform a peak power search. This step may be performed using one or more controllers of the power system. The decision may be made based on one or more parameters/factors (e.g., a time parameter, for example related to a time interval for performing peak power sweeps/peak power searches, and/or whether or not the necessary elements of the power system [e.g. one or more controller, auxiliary power unit] are available to perform operations related to the peak sweep/peak search).

If in step 1702 the decision is not to perform the peak power search, then this step may be performed again at a subsequent time (e.g., after a certain interval of time, and/or based on/in response to one or more obtained signals and/or parameters).

If in step 1702 the decision is to perform the peak power search, then the process 1700 may proceed to step 1704.

In step 1704 a peak power search is performed. This peak sweep/peak search may be performed using one or more controllers of the power system. This peak sweep/peak search may be performed at relatively lesser voltage values.

In step 1706 a peak power voltage is determined. This peak power voltage may be determined using one or more controllers of the power system. This peak power voltage may be determined using data obtained during step 1704 (e.g., including data obtained at relatively lesser voltage values). This peak power voltage may be determined at least in part by building an I-V curve with obtained data (e.g., a graph similar to graph 1500 or graph 1502 of FIGS. 15A and 15B).

In step 1708 one or more element of the power system (e.g., one or more power device, power stage, etc.) is operated according to the determined peak power voltage (e.g., determined in step 1706).

The process 1700 starting at step 1702 may then be repeated again at a subsequent time (e.g., after a certain interval of time, and/or based on/in response to one or more obtained signals and/or parameters).

Figure 18:
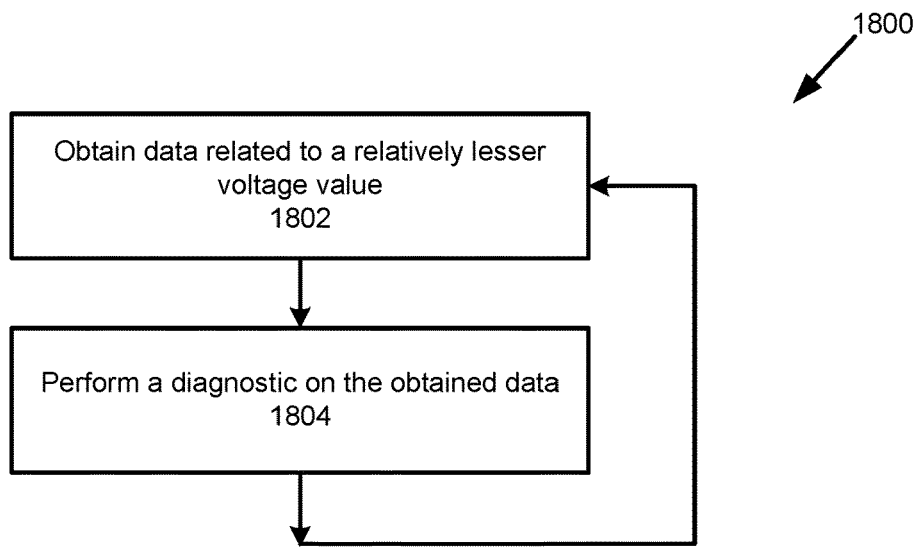
FIG. 18 shows a flow chart of a method, in accordance with certain examples of the presently disclosed subject matter.

FIG. 18 shows a flow chart/process of a method 1800 according to examples of the present subject matter. The shown example relates to a peak power search, but similar operations may be performed for other current-voltage operating point searches (e.g., using a power device having a plurality of auxiliary power units).

In step 1802 data is obtained related to a relatively lesser voltage. This step may be performed using one or more controllers of the power system (e.g., using a power device 106 with a plurality of controllers and/or a plurality of auxiliary power units). This data may be obtained by performing a peak sweep/peak search at relatively lesser voltage values (e.g., similar to the peak sweep/peak search done in step 1704 of FIG. 17, for example, including data obtained at relatively lesser voltage values).

In step 1804 a diagnostic may be performed on the obtained data. This step may be performed using one or more controllers of the power system. For example, the diagnostic may include one or more determinations related to the performance and or health of one or more element of the power system (e.g., one or more power source, one or more power device, power stage, etc.). The diagnostic may cause one or more further operations based on the diagnostic (e.g., the generation of one or more signal [audio and/or visual] and/or a change in operation of one or more elements of the power system, for example the bypass or shut down of one or more elements). As an example, the obtained data may be used to build one or more graphs (e.g., related to the performance of one or more elements of the power system; for example, graphs similar to graph 1500, graph 1502, and graph 1600, of FIGS. 15A, 15B, and 16).

The process 1800 starting at step 1802 may then be repeated again at a subsequent time (e.g., after a certain interval of time, and/or based on/in response to one or more obtained signals and/or parameters).

Figure 19:
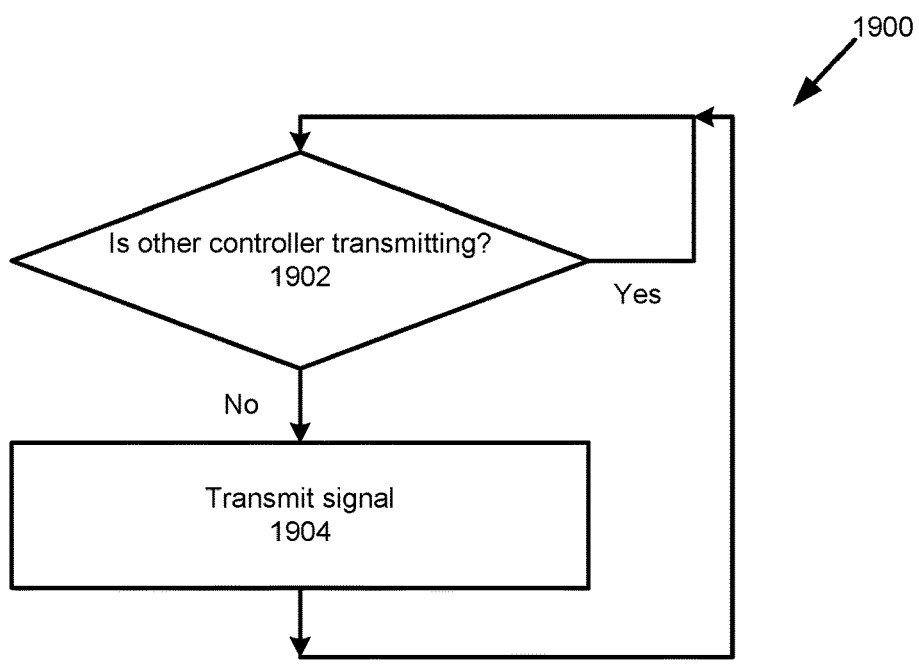
FIG. 19 shows a flow chart of a method, in accordance with certain examples of the presently disclosed subject matter.

FIG. 19 shows a flow chart/process 1900 of a method according to examples of the present subject matter.

Process 1900 may be used to help synchronize the transmissions of one or more controllers and/or PLC units of a power device 106 (e.g., in a case where the power device has a plurality of controllers and/or PLC units).

In step 1902 a decision is made whether one or more controller/PLC unit is transmitting. This step may be performed using one or more other controllers of the power system. The decision may be made based on one or more obtained parameters (e.g., a time parameter, electrical parameter, communication parameter, etc.).

If in step 1902 the decision is that one or more controller/PLC unit is transmitting, then this step may be performed again at a subsequent time (e.g., after a certain interval of time, and/or based on/in response to one or more obtained signals and/or parameters).

If in step 1902 the decision is that one or more controller/PLC unit is not transmitting, then the process 1900 may proceed to step 1904.

In step 1904 a signal is transmitted. This signal may be transmitted using one or more controllers/PLC units of the power system.

The process 1900 starting at step 1902 may then be repeated again at a subsequent time (e.g., after a certain interval of time, and/or based on/in response to one or more obtained signals and/or parameters).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:
   a housing;
   a power device comprising:
      a plurality of power stages, the plurality of power stages comprising a first power stage and a second power stage,
      the first power stage comprising:
         a first pair of input terminals,
         a first pair of output terminals, and
         a first power converter electrically connected between the first pair of input terminals and the first pair of output terminals,
      the second power stage comprising:
         a second pair of input terminals,
         a second pair of output terminals, and
         a second power converter electrically connected between the second pair of input terminals and the second pair of output terminals,
   at least one controller, and
   a plurality of auxiliary power sources, the plurality of auxiliary power sources comprising a first auxiliary power source and a second auxiliary power source;
   wherein:
      the first power stage is configured to be electrically connected to a first photovoltaic (PV) panel via the first pair of input terminals,
      the second power stage is configured to be electrically connected to a second PV panel via the second pair of input terminals,
      the first pair of output terminals are connected to the second pair of output terminals thereby connecting the first power stage and the second power stage in parallel at a power device output,
      the power device is configured to convert a first input power from the first PV panel and a second input power from the second PV panel to a combined output power at the power device output,
      the first power stage and the second power stage are enclosed in the housing,
      the first auxiliary power source is configured to provide auxiliary power to the plurality of power stages while the second auxiliary power source is configured to provide power to the at least one controller, and
      the at least one controller is configured to perform an operating point search starting at about 0 volts using power from the second auxiliary power source while the first auxiliary power source provides auxiliary power to the first power stage and the second power stage.

2. The apparatus of claim 1, wherein at least one power stage of the plurality of power stages comprises a direct current (DC) to DC power converter.

3. The apparatus of claim 1, wherein the plurality of power stages share a ground potential.

4. The apparatus of claim 1, wherein the at least one controller is configured to control the combined output power of the apparatus.

5. The apparatus of claim 1, further comprising an output inductor shared by the plurality of power stages, wherein the output inductor comprises a first winding and a second winding.

6. The apparatus of claim 1, wherein the plurality of power stages are configured to receive power from at least one shared auxiliary power source.

7. The apparatus of claim 1, wherein the at least one controller is configured to obtain data relating to a voltage that is less than a threshold voltage of the at least one controller.

8. The apparatus of claim 1, wherein the at least one controller is configured to be shared by the plurality of power stages.

9. The apparatus of claim 1, wherein the at least one controller is electrically connected to each of the plurality of power stages.

10. The apparatus of claim 1, further comprising at least one circuit shared by the plurality of power stages, wherein the at least one circuit is configured to discharge a voltage relating to the power device.

11. The apparatus of claim 1, wherein the plurality of power stages are located on a single printed circuit board (PCB).

12. A system comprising:
a plurality of photovoltaic (PV) panels, the plurality of PV panels comprising a first PV panel and a second PV panel;
a housing;
a power device comprising:
a plurality of power stages, the plurality of power stages comprising a first power stage and a second power stage,
the first power stage comprising:
a first pair of input terminals,
a first pair of output terminals, and
a first power converter electrically connected between the first pair of input terminals and the first pair of output terminals,
the second power stage comprising:
a second pair of input terminals,
a second pair of output terminals, and
a second power converter electrically connected between the second pair of input terminals and the second pair of output terminals,
at least one controller,
a plurality of auxiliary power sources, the plurality of auxiliary power sources comprising a first auxiliary power source and a second auxiliary power source;
wherein:
the first power stage is electrically connected to the first PV panel via the first pair of input terminals,
the second power stage is electrically connected to the second PV panel via the second pair of input terminals,
the first pair of output terminals are connected to the second pair of output terminals thereby connecting the first power stage and the second power stage in parallel at a power device output,
the power device is configured to convert a first input power from the first PV panel and a second input power from the second PV panel to a combined output power at the power device output,
the first power stage and the second power stage are enclosed in the housing, and
the at least one controller is configured to perform an operating point search starting at about 0 volts using power from the second auxiliary power source while the first auxiliary power source provides auxiliary power to the first power stage and the second power stage.

13. The system of claim 12, wherein at least one power stage of the plurality of power stages comprises a direct current (DC) to DC power converter.

14. The system of claim 12, wherein the at least one controller is configured to control the combined output power of the power device.

15. The apparatus of claim 1, wherein the power device output is configured to be connected to a second power device output of a second apparatus of claim 1.

16. The system of claim 12, further comprising a second power device, wherein the power device output is connected to a second power device output of the second power device.

17. A method comprising:
converting, by a first power stage of a plurality of power stages enclosed in a housing, a first input power received from a first photovoltaic (PV) panel via a first pair of input terminals of the first power stage;
converting, by a second power stage of the plurality of power stages, a second input power received from a second PV panel via a second pair of input terminals of the second power stage, wherein a first pair of output terminals of the first power stage are connected to a second pair of output terminals of the second power stage thereby connecting the first power stage and the second power stage in parallel at a power device output;
generating, at the power device output, a combined output power by combining the converted first input power and the converted second input power; and
performing, by at least one controller powered by a second auxiliary power source of a plurality of auxiliary power sources, an operating point search starting at about 0 volts while a first auxiliary power source of the plurality of auxiliary power sources provides auxiliary power to the first power stage and the second power stage.

18. The method of claim 17, wherein the first power stage comprises a first power converter and the second power stage comprises a second power converter.

19. The method of claim 17, further comprising controlling, by the at least one controller, the combined output power of a power device.

20. The method of claim 17, further comprising discharging, by at least one circuit shared by the plurality of power stages, a voltage relating to a power device.

* * * * *